(12) United States Patent
Yamashita

(10) Patent No.: US 8,548,043 B2
(45) Date of Patent: Oct. 1, 2013

(54) SIGNAL TRANSMITTING DEVICE AND SIGNAL TRANSMITTING METHOD

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 13/030,248

(22) Filed: Feb. 18, 2011

(65) Prior Publication Data

US 2011/0211116 A1 Sep. 1, 2011

(30) Foreign Application Priority Data

Feb. 26, 2010 (JP) ................ P2010-042001

(51) Int. Cl.
*H04N 7/50* (2006.01)

(52) U.S. Cl.
USPC ............. 375/240.02; 375/0.01; 348/723; 348/500; 348/441; 348/223.1

(58) Field of Classification Search
USPC .................. 375/240.01–240.29
See application file for complete search history.

(56) References Cited

U.S. PATENT DOCUMENTS

| | | | |
|---|---|---|---|
| 2005/0281296 A1* | 12/2005 | Yamashita | 375/366 |
| 2009/0213265 A1* | 8/2009 | Yamashita | 348/500 |
| 2009/0290634 A1* | 11/2009 | Yamashita | 375/240.01 |
| 2009/0303385 A1* | 12/2009 | Yamashita | 348/500 |
| 2010/0007787 A1* | 1/2010 | Yamashita | 348/441 |
| 2011/0149110 A1* | 6/2011 | Sugiyama | 348/223.1 |
| 2011/0273623 A1* | 11/2011 | Yamashita | 348/723 |

FOREIGN PATENT DOCUMENTS

JP 2005 328494 11/2005

* cited by examiner

*Primary Examiner* — David Czekaj
*Assistant Examiner* — Shanika Brumfield
(74) *Attorney, Agent, or Firm* — Frommer Lawrence & Haug LLP; William S. Frommer

(57) ABSTRACT

Disclosed herein is a signal transmitting device including a multiplexing section configured to generate a B/R ch by alternately multiplexing image signals read from B pixels and R pixels among image signals read and input in units of a predetermined number of samples in each of the first line and the second line from said image pickup element in an active region corresponding to a C ch in HD-SDI together with start code of one of SAV and EAV, and generate a G ch by multiplexing, in order, image signals read from G pixels in an active region corresponding to a Y ch in HD-SDI together with said start code; and an 8B/10B encoder configured to output serial digital data converted by 8B/10B-encoding the active regions on the B/R ch and the G ch having data structures corresponding to said HD-SDI and an auxiliary data region including SAV, EAV, LN, and CRCC.

13 Claims, 14 Drawing Sheets

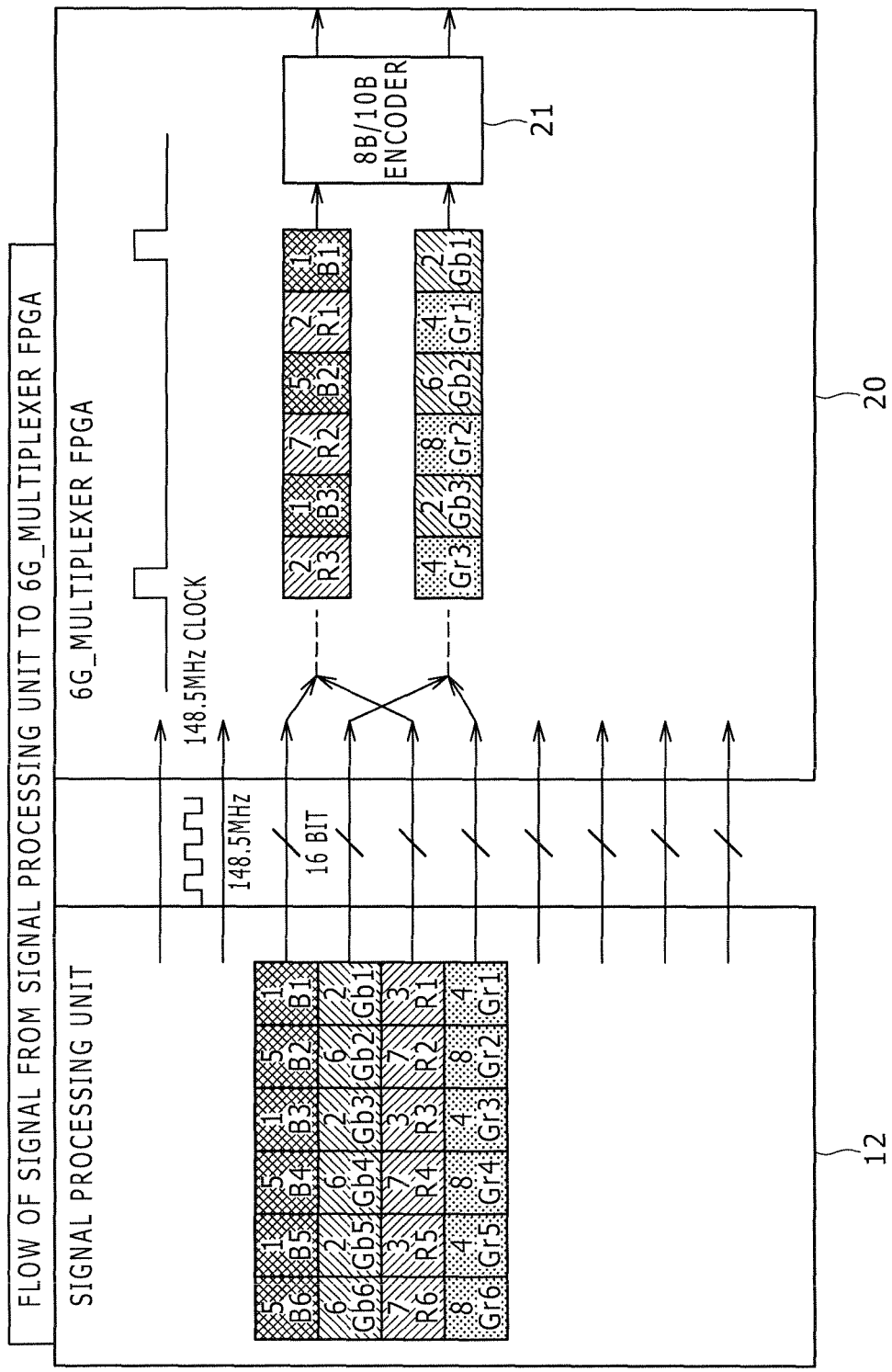

NOTES:
(1) BECAUSE ALL DATA IS SUBJECTED TO 8B/10B CONVERSION, TWO BYTES OF K28.5 SUFFICES FOR BYTE BOUNDARY DETECTION.
(2) BECAUSE ONLY 8B/10B CONVERSION IS PERFORMED, UNUSED BITS MAY BE SET AS RESERVE (= 0).
(3) LN11 IS ADDED TO LN DEFINED IN SMPTE 292 TO DEFINE 2250 LINES.

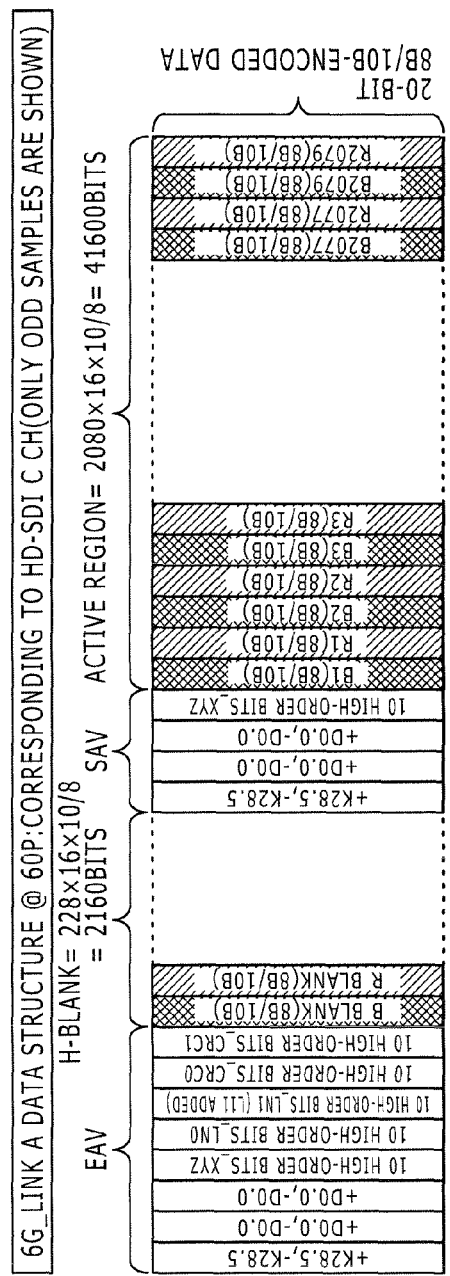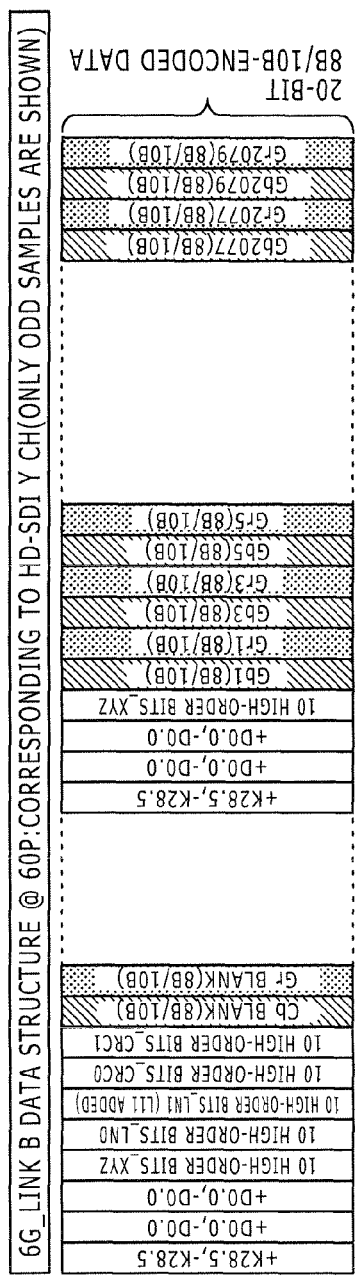
FIG. 8A
FIG. 8B
NOTES:
(1) BECAUSE ALL DATA IS SUBJECTED TO 8B/10B CONVERSION, TWO BYTES OF K28.5 SUFFICES FOR BYTE BOUNDARY DETECTION.
(2) BECAUSE ONLY 8B/10B CONVERSION IS PERFORMED, UNUSED BITS MAY BE SET AS RESERVE (= 0).
(3) LN11 IS ADDED TO LN DEFINED IN SMPTE 292 TO DEFINE 2250 LINES.

R'G'B' OR Y' C$_B$ C$_R$ 4:4:4 SYSTEM

- ▨ R' OR C$_R$' COMPONENT
- ▨ G' OR Y' COMPONENT
- ▨ B' OR C$_B$' COMPONENT

Y' C$_B$ C$_R$ 4:2:2 SYSTEM

SIGNAL TRANSMITTING DEVICE AND SIGNAL TRANSMITTING METHOD

BACKGROUND OF THE INVENTION

1. Field of the Invention

The present invention relates to a signal transmitting device and a signal transmitting method suitable for application to a case of transmitting an image signal output from an image sensor of a double density Bayer structure, for example.

2. Description of the Related Art

In the past, development of receiving systems and image pickup systems for ultrahigh resolution video signals surpassing an HD (High Definition) signal as a current image signal (video signal) in which one frame is 1920 samples×1080 lines is underway. For example, UHDTV (Ultra High Definition TV) standards as a next-generation broadcasting system having 4 times or 16 times the number of pixels of current HD are being established by international societies. The international societies include the ITU (International Telecommunication Union) and SMPTE (Society of Motion Picture and Television Engineers).

Video standards proposed to the ITU and SMPTE relate to video signals of 3840 samples×2160 lines or 7680 samples× 4320 lines, which video signals have twice or four times the number of samples and the number of lines of a video signal of 1920 samples×1080 lines. Of the video standards, the standard established by the ITU is referred to as LSDI (Large Screen Digital Imagery), and is referred to as UHDTV proposed to SMPTE.

There are two kinds of sample structure of pixels as follows in the 4096 standards defined by SMPTE 2048-1 and SMPTE 2036-1 (UHDTV), as shown in FIGS. 14A and 14B.

FIGS. 14A and 14B are diagrams of assistance in explaining an example of sample structure of the 4096 standards. One frame used for description in FIGS. 14A and 14B is formed by 4096 samples×2160 lines (hereinafter referred to also as one frame of a 4 k×2 k signal). There are three kinds of sample structure of the 4096 standards as follows. Incidentally, in the SMPTE standards, signals to which a dash (') is attached, such as R', G', B' and the like, represent signals resulting from gamma correction or the like.

FIG. 14A shows an example of an R'G'B' or Y'Cb'Cr' 4:4:4 system. In this system, all samples include RGB or YCbCr components.

FIG. 14B shows an example of a Y'Cb'Cr' 4:2:2 system. In this system, even samples include YCbCr components, and odd samples include Y components.

Differences between a normal Bayer structure and a double density Bayer structure will be described in the following with reference to FIGS. 15A and 15B.

In the past, an image pickup device using an image pickup element of a Bayer structure is commonly known. Such an image pickup element captures the image light of a subject through a color filter, and outputs an image signal according to the intensity of the image light. Then, a subsequent processing section subjects the image signal to predetermined processing. The image pickup device can thereby display an image on a viewfinder or an external display device. In the image pickup element, R, G, and B pixels capable of outputting R, G, and B signals, respectively, are generally arranged in a predetermined pattern. Resolution differs depending on how the R, G, and B pixels are arranged.

FIG. 15A shows an example of the normal Bayer structure.

In the normal Bayer structure, two G pixels are arranged on a diagonal line, and an R pixel and a B pixel are arranged on a diagonal line orthogonal to the diagonal line of the G pixels. However, the normal Bayer structure provides only half the number of pixels of a 4 k×2 k signal on a G ch, which has a largest number of pixels.

FIG. 15B shows an example of the double density Bayer structure.

In the double density Bayer structure, pixels in the normal Bayer structure shown in FIG. 15A are arranged obliquely at 45°. The pixels have half the size of the pixels in the normal Bayer structure in a vertical direction and a horizontal direction. Thus, a double density Bayer G ch has a resolution corresponding to the number of pixels of a 4 k×2 k signal. The size of one pixel becomes correspondingly small, but does not need to be made smaller than in a case of providing 4 k×2 k pixels on the G ch in the normal Bayer structure, because of the oblique arrangement. Thus, resolution and sensitivity are made compatible with each other in a well-balanced manner, which is an advantage over the normal Bayer structure.

In addition, Japanese Patent Laid-Open No. 2005-328494 discloses a technique for transmitting a 3840×2160/30 P, 30/1.001 P/4:4:4/12-bit signal, which is a kind of 4 k×2 k signal (ultrahigh resolution signal of 4 k samples and 2 k lines), at a bit rate of 10 Gbps or more. Incidentally, [3840× 2160/30 P] denotes [number of pixels in the horizontal direction]×[number of lines in the vertical direction]/[number of frames per second]. In addition, [4:4:4] denotes a ratio of [red signal R:green signal G:blue signal B] in a case of a primary-color signal transmission system and a ratio of [luminance signal Y:first color-difference signal Cb:second color-difference signal Cr] in a case of a color-difference signal transmission system.

SUMMARY OF THE INVENTION

In the past, a broadcasting camera is used as a transmitting device for transmitting an image signal, and a CCU is used as a receiving device for receiving the image signal. The frame rate of the image signal is 23.98 P, 24 P, 25 P, 29.97 P, 30 P, 47.95 P, 48 P, 50 P, 59.94 P, or 60 P, and quantization bits are 16 bits. Thus, with increases in the number of pixels, the power consumption of the broadcasting camera is also increasing. Further, there is a desire to transmit raw data (whole data) from the broadcasting camera that needs remote feeding from the CCU or the like to a signal processing unit provided in the CCU by an optical fiber or the like.

However, an interface or an interface data structure for transmitting a video signal received from an image pickup element of the double density Bayer structure has not been proposed. Therefore the signal cannot be transmitted.

The present invention has been made in view of such a situation. It is desirable to transmit an image signal received from an image pickup element of the double density Bayer structure using a current transmission format.

The present invention is applied to a case of processing an image signal received from an image pickup element of the double density Bayer structure as a pixel arrangement in which the pixel density of a Bayer structure is doubled and pixels are arranged obliquely at 45° with respect to the Bayer structure. The double density Bayer structure in the image pickup element is a structure such that a first line read in order of a B pixel, a G pixel, an R pixel, and a G pixel and a second line read in order of an R pixel, a G pixel, a B pixel, and a G pixel are arranged alternately in a horizontal direction.

At this time, a B/R ch is generated by alternately multi-plexing image signals read from B pixels and R pixels among image signals read and input in units of a predetermined number of samples in each of the first line and the second line from the image pickup element in an active region corresponding to a C ch in HD-SDI.

In addition, a G ch is generated by multiplexing, in order, image signals read from G pixels in an active region corresponding to a Y ch in HD-SDI.

Then, serial digital data converted by 8B/10B-encoding the active regions on the B/R ch and the G ch having data structures corresponding to the Y ch and the C ch of HD-SDI and an auxiliary data region including SAV, EAV, LN, and CRCC is output.

Thus, a video signal received from an image pickup element of the double density Bayer structure can be multiplexed, 8B/10B-encoded, and transmitted.

According to the present invention, a B/R ch is generated by alternately multiplexing image signals read from B pixels and R pixels among video signals received from an image pickup element of the double density Bayer structure in an active region corresponding to a C ch in HD-SDI. In addition, a G ch is generated by multiplexing, in order, image signals read from G pixels in an active region corresponding to a Y ch in HD-SDI. Thus, image signals can be transmitted in a data format similar to the transmission format of conventional HD-SDI. In addition, traditionally used transmission lines can be used without new transmission lines being provided, so that an effect of improving convenience is obtained.

BRIEF DESCRIPTION OF THE DRAWINGS

FIG. 5 is a diagram of assistance in explaining an example of processing of a signal supplied from a signal processing unit according to the first embodiment of the present invention to a 6G multiplexer FPGA capable of processing a 6G signal;

FIGS. 8A and 8B are diagrams of assistance in explaining an example of data structure when a video signal is transmitted at 5.94 Gbps according to the second embodiment of the present invention;

DETAILED DESCRIPTION OF THE PREFERRED EMBODIMENTS

The best mode for carrying out the invention (hereinafter referred to as embodiments) will hereinafter be described. Incidentally, description will be made in the following order.
1. First Embodiment (Example of Transmitting Double Density Bayer 4 k/23.98 P-30 P/16-Bit Signal at 5.94 Gbps on 2 Ch Using 8B/10B Code)
2. Second Embodiment (Example of Transmitting Double Density Bayer 4 k/47.95 P-60 P/16-Bit Signal at 5.94 Gbps on 4 Ch Using 8B/10B Code)
3. Third Embodiment (Example of Transmitting Double Density Bayer 4 k/23.98 P-30 P/16-Bit Signal at 10.692 Gbps on 1 Ch Using 8B/10B Code and Scramble)
4. Fourth Embodiment (Example of Transmitting Double Density Bayer 4 k/47.95 P-60 P/16-Bit Signal at 10.692 Gbps on 2 Ch Using 8B/10B Code and Scramble)
5. Fifth Embodiment (Example of Transmitting Double Density Bayer CinemaScope (Aspect Ratio of 1:2.4) 4 k/36 P/16-Bit Signal at 10.692 Gbps on 1 Ch Using 8B/10B Code and Scramble)
6. Sixth Embodiment (Example of Transmitting Double Density Bayer CinemaScope (Aspect Ratio of 1:2.4) 4 k/72 P/16-Bit Signal at 10.692 Gbps on 2 Ch Using 8B/10B Code and Scramble)

<1. First Embodiment>
[Example of Transmitting Double Density Bayer 4 k/23.98 P-30 P/16-Bit Signal at 5.94 Gbps on 2 Ch Using 8B/10B Code]

A first embodiment of the present invention will be described in the following with reference to FIGS. 1 to 6B.

Description in the following will be made of an example of transmitting a double density Bayer 4 k/23.98 P-30 P/16-bit signal at 5.94 Gbps on 2 Ch using 8B/10B code. The following abbreviation may be used for a system of discretely reducing 4096×2160/23.98 P, 24 P, 25 P, 29.97 P, 30 P/4:4:4, 4:2:2/10-bit, 12-bit pixel samples. 23.98 P, 24 P, 25 P, 29.97 P, 30 P may be abbreviated to "23.98 P-30 P." In addition, 5.94 G may be abbreviated to "6G." A notation "double density Bayer 4 k/47.95 P-60 P/16-bit signal," for example, has the following meanings: an image pickup element of a double density Bayer structure is formed by 4096×2160 pixels, the frame rate of an image signal is 47.95 P-60 P, and the quantization bits of the image signal output by the pixels are 16 bits.

Figure 1:
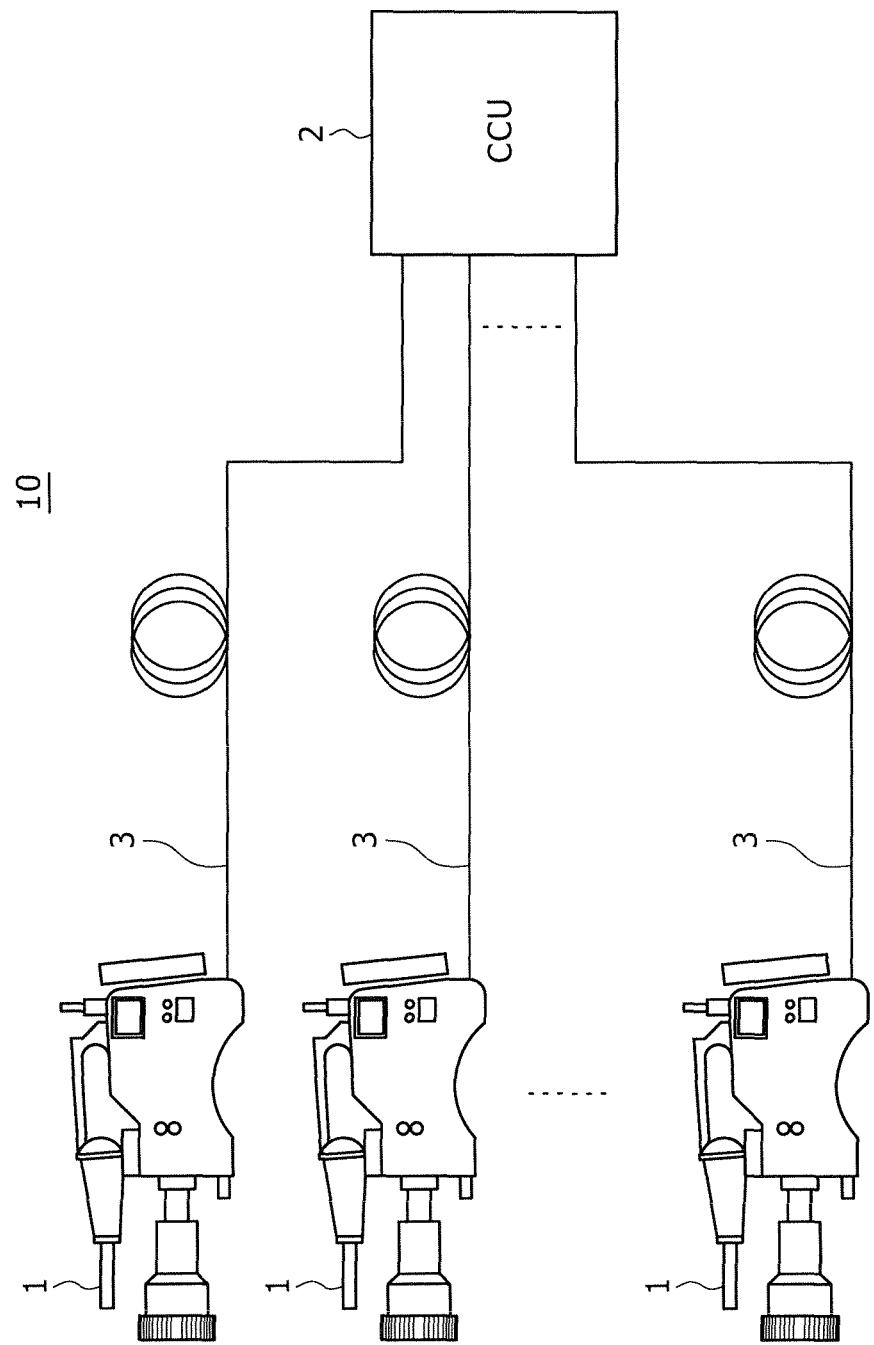
FIG. 1 is a diagram showing a general configuration of a camera transmission system for a television broadcasting station according to a first embodiment of the present invention.

FIG. 1 is a diagram showing a general configuration of a signal transmission system 10 for a television broadcasting station to which system the present embodiment is applied. The signal transmission system 10 includes a plurality of broadcasting cameras 1 and a CCU (Camera Control Unit) 2.

Each broadcasting camera 1 is connected to the CCU 2 by an optical fiber cable 3. The broadcasting cameras 1 are used as a signal transmitting device to which a signal transmitting method for transmitting a serial digital signal is applied. The CCU 2 is used as a signal receiving device to which a signal receiving method for receiving the serial digital signal is applied. The signal transmission system 10 combining the broadcasting cameras 1 and the CCU 2 is used as a signal transmission system in which serial digital signals are transmitted and received.

The broadcasting cameras 1 are of an identical configuration. The broadcasting cameras 1 function as a signal transmitting device for generating a 4096×2160/23.98 P-60 P/4:2:2 Bayer structure/16-bit signal for digital cinema as a 4 k×2 k signal, and transmitting the 4096×2160/23.98 P-60 P/4:2:2 Bayer structure/16-bit signal to the CCU 2. An ultrahigh resolution signal of 4 k samples×2 k lines will hereinafter be referred to as a "4 k×2 k signal."

The CCU 2 is a unit for controlling each broadcasting camera 1, receiving a video signal from each broadcasting camera 1, and transmitting a video signal (return video) for displaying the video being photographed by one of the broadcasting cameras 1 to the monitor of each broadcasting camera 1. The CCU 2 functions as a signal receiving device for receiving a video signal from each broadcasting camera 1.

Figure 2:
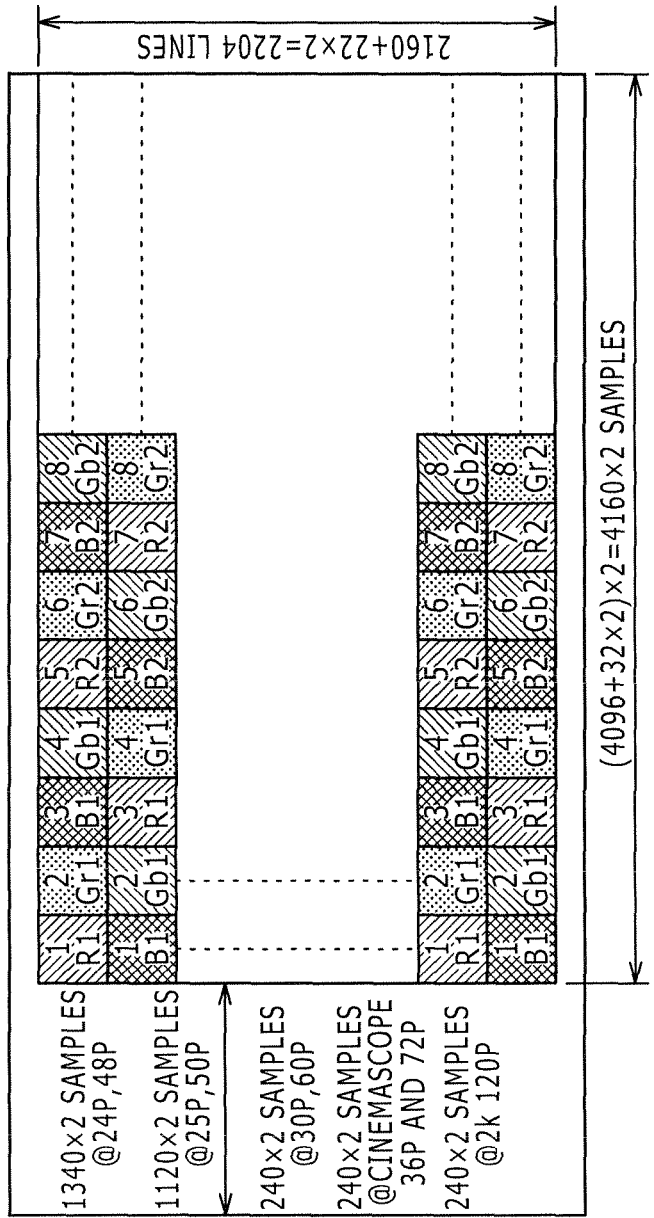
FIG. 2 is a diagram of assistance in explaining an example of a video signal output by 4 k×2 k pixels of a double density Bayer structure.

FIG. 2 shows an example of a video signal output by the 4 k×2 k pixels of the double density Bayer structure.

An image pickup element (image sensor 11 to be described later) in the present example has the double density Bayer structure as a pixel arrangement formed by doubling the pixel density of the Bayer structure and arranging pixels obliquely at 45° with respect to the Bayer structure. Each pixel outputs a video signal according to predetermined readout timing. The double density Bayer structure has about 2 k samples of R and B among about 8 k samples in a lateral direction, and about 2 k samples of each of Gb and Gr (Gb and Gr are different representations for convenience, but refer to the same) or about 4 k samples in total among the about 8 k samples in the lateral direction. The image pickup element in the present example has a structure in which first lines from which readout is performed in order of B, Gb, R, and Gr pixels and second lines from which readout is performed in order of R, Gr, B, and Gb pixels are arranged alternately in a horizontal direction.

The number of effective pixels of each of R and B is 2048, and R and B have an additional effective area (margin) of 16 pixels on each of a left side and a right side. A total number of effective pixels of each of R and B is 2080. The number of effective pixels of Gr/Gb is 4096, and Gr/Gb has an additional effective area (margin) of 32 pixels on each of a left side and a right side. A total number of effective pixels of Gr/Gb is 4160. The number of effective pixels in a vertical direction or the number of lines is 2160. The 2160 lines have 22 additional effective lines (margin) on each of a top side and a bottom side. A total number of effective lines is 2204.

An H-blank region is (4400 pixels×2 ch−4160×2 pixels) =240×2 pixels at 30 P such that one line is twice that of the HD data structure. FIG. 2 shows the number of H-blank pixels at 24 P and 25 P. A V-blank region is designed as 2250 lines−2204 lines=46 lines so that a total number of lines is twice that of HD.

Figure 3:
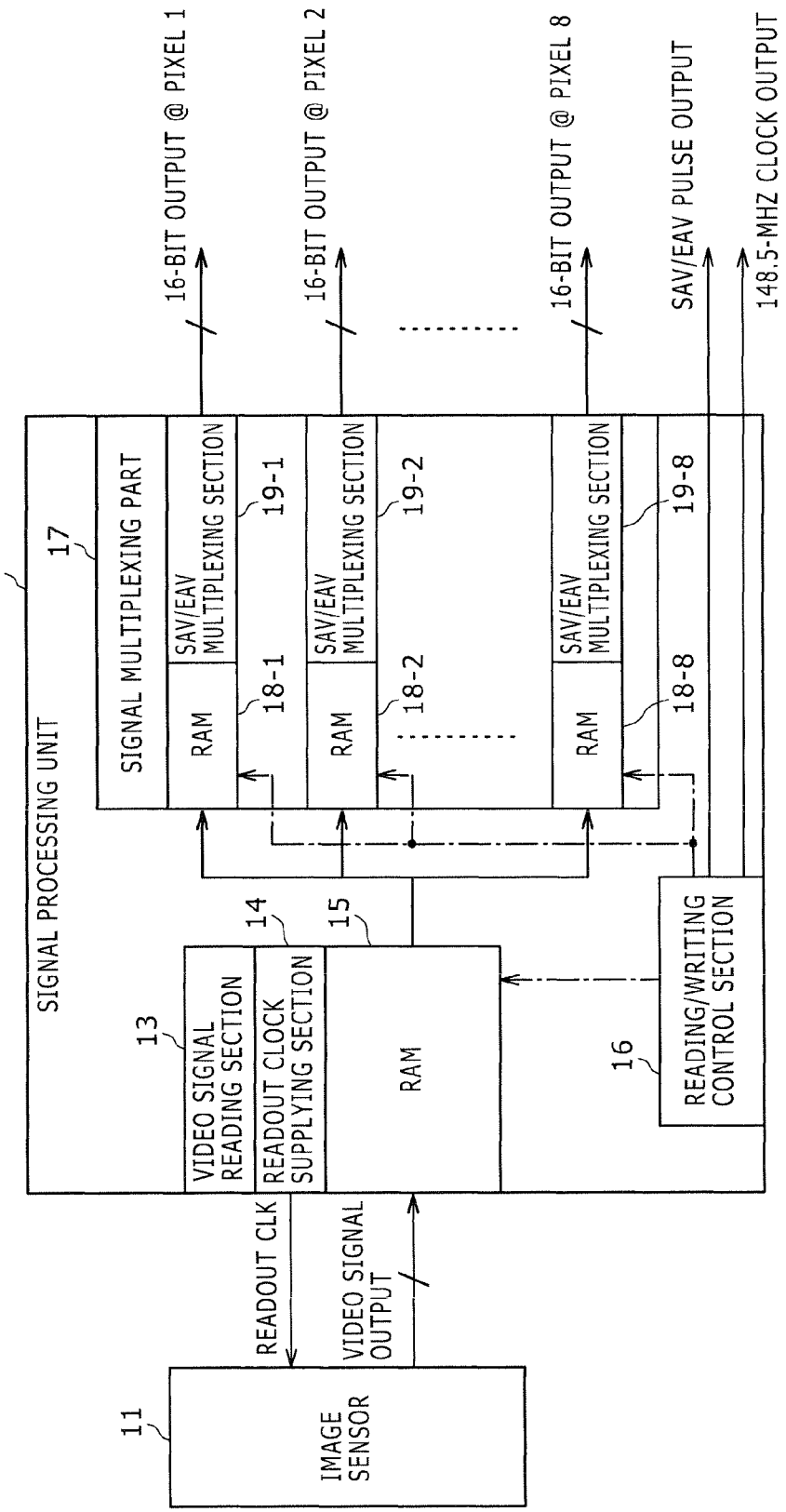
FIG. 3 is a block diagram showing an example of internal configuration of a broadcasting camera according to the first embodiment of the present invention.

FIG. 3 shows an example of internal configuration of a broadcasting camera 1.

Figure 15A:
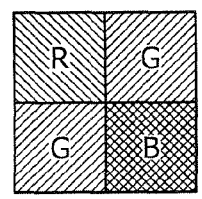
FIGS. 15A and 15B are diagrams of assistance in explaining an example of a video signal output by 4 k×2 k pixels of the double density Bayer structure.
Figure 15B:
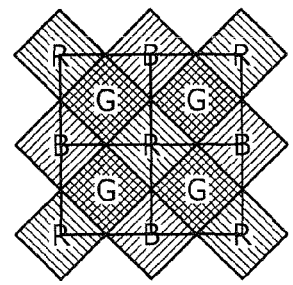

The broadcasting camera 1 includes an image sensor 11 of the double density Bayer structure and a signal processing unit 12 for processing a video signal received from the image sensor 11 as appropriate. A CMOS (Complementary Metal Oxide Semiconductor) sensor or a CCD (Charge Coupled Device) imager, for example, is used as the image sensor 11. A 4 k signal of the image sensor 11 of the double density Bayer structure shown in FIG. 15B is read out from a lower left in units of eight pixels, for example.

The signal processing unit 12 includes a RAM 15 for temporarily storing a video signal received from the image sensor 11 and a video signal reading section 13 for reading the video signal from the RAM 15. The signal processing unit 12 also includes a readout clock supplying section 14 for supplying a video signal readout clock to the image sensor 11.

The signal processing unit 12 also includes a reading/writing control section 16 for controlling a signal reading process of the video signal reading section 13 and an operation of writing the read video signal to RAMs 18-1 to 18-8.

The signal processing unit 12 also includes a signal multiplexing part 17 for rearranging a sensor signal and multiplexing the sensor signal with timing reference signals SAV and EAV. The signal multiplexing part 17 includes the RAMs 18-1 to 18-8 and SAV/EAV multiplexing sections 19-1 to 19-8 to output eight video signals. The signal multiplexing part 17 multiplexes data with an image signal read and input in units of a predetermined number of samples in each first or second line from the image sensor 11. At this time, the signal multiplexing part 17 generates a B/R ch by alternately multiplexing image signals read from B and R pixels with SAV or EAV start code in an active region corresponding to a C ch in HD-SDI. Meanwhile, the signal multiplexing part 17 generates a G ch by multiplexing, in order, image signals read from G pixels with the start code in an active region corresponding to a Y ch in HD-SDI.

Under control of the reading/writing control section 16, the video signal read from the RAM 15 is written to each of the RAMs 18-1 to 18-8. The RAMs 18-1 to 18-8 are provided so as to correspond to a process of reading an image signal in FIG. 15B in units of eight pixels. The pixels are written to the RAMs 18-1 to 18-8 pixel by pixel. Then, the SAV/EAV multiplexing sections 19-1 to 19-8 rearrange the image signals read from the RAMs 18-1 to 18-8, multiplex the rearranged image signals with SAV/EAV, and thereafter output the result with one pixel as a 16-bit image signal.

The reading/writing control section 16 not only supplies a writing clock to the RAMs 18-1 to 18-8 but also outputs an SAV/EAV pulse and a 148.5-MHz clock. The pulse and the clocks are used in a subsequent processing section not shown in the figure.

Figure 4:
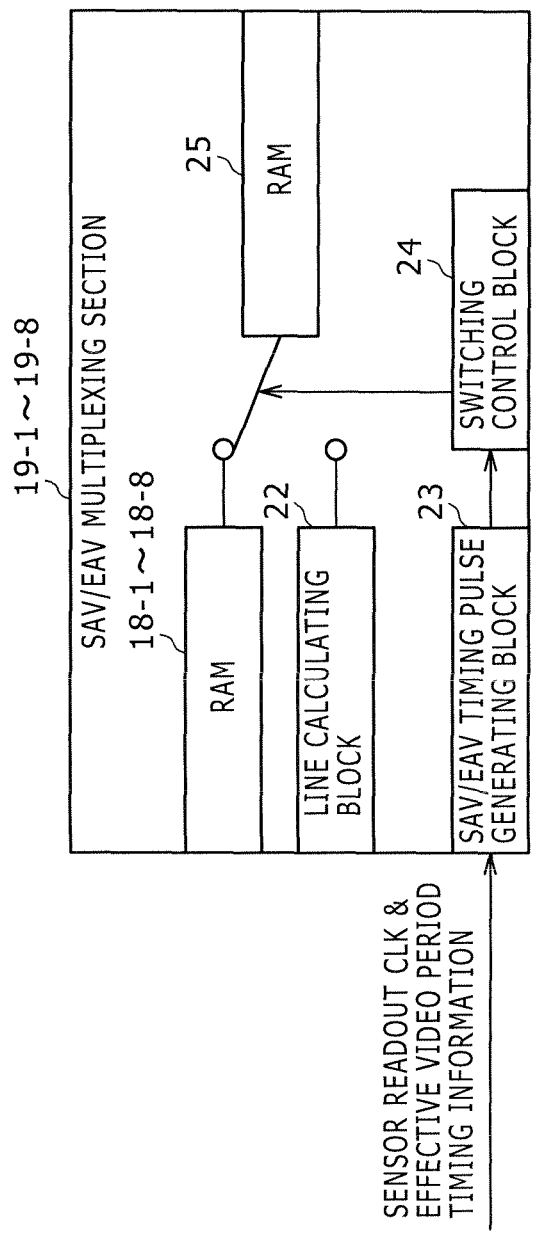
FIG. 4 is a block diagram showing an example of internal configuration of an SAV/EAV multiplexing section according to the first embodiment of the present invention.

FIG. 4 shows an example of internal configuration of the SAV/EAV multiplexing sections 19-1 to 19-8.

The SAV/EAV multiplexing sections 19-1 to 19-8 include a line calculating block 22 for calculating SAV/EAV, LN, and CRCC, and an SAV/EAV timing pulse generating block 23 for generating an SAV/EAV timing pulse.

The video signal input from the image sensor 11 is stored in the RAMs 18-1 to 18-8. When the video signal is transmitted as it is, the signal receiving device cannot recognize break positions of the video signal. Thus, the line calculating block 22 calculates the positions of SAV/EAV/LN and CRCC.

The SAV/EAV timing pulse generating block 23 receives the readout clock for controlling the timing of reading the image signal from the image sensor 11 and information on timing of an effective video period from the reading/writing control section 16. The timing information is information on the effective video period during which video data is superimposed on the image signal. The SAV/EAV timing pulse generating block 23 generates a timing pulse for multiplexing the image signal in an active region on the B/R ch or G ch of HD-SDI.

The SAV/EAV multiplexing sections 19-1 to 19-8 also include a switching control block 24 for controlling the writing of data to a RAM 25 by switching to either the RAMs 18-1 to 18-8 or the line calculating block 22. The switching control block 24 changes timing of reading the image signal from the image sensor 11 on the basis of the timing pulse received from the SAV/EAV timing pulse generating block 23. The switching control block 24 multiplexes the image signal in an active region on the B/R ch or G ch of HD-SDI while changing the reading timing, and switches to multiplex SAV/EAV/LN and CRCC.

FIG. 5 shows an example of processing of a signal supplied from the signal processing unit 12 to a 6G multiplexer FPGA 20 capable of processing a 6G signal. A video signal transmitted at 5.94 Gbps will hereinafter be referred to also as a "6G signal."

The signal processing unit 12 outputs the image signal in order of a B signal, a Gb signal, an R signal, and a Gr signal.

The broadcasting camera 1 includes the 6G multiplexer FPGA 20. The 6G multiplexer FPGA 20 rearranges the image signal received from the signal processing unit 12 into predetermined order at each 148.5-MHz clock. A timing pulse is input to the 6G multiplexer FPGA 20 at each clock in timing of SAV/EAV. The SAV/EAV is multiplexed by the signal processing unit 12 in advance. Incidentally, while the 6G multiplexer FPGA 20 and the signal processing unit 12 are represented as different functional blocks in FIG. 5, the signal multiplexing part 17 in the signal processing unit 12 in FIG. 3 is formed in the 6G multiplexer FPGA 20 in practice.

The 6G multiplexer FPGA 20 performs the following processing when the frame rate of the image signal input from the image sensor 11 is 23.98 P, 24 P, 25 P, 29.97 P, or 30 P. In this case, the image sensor 11 needs to be formed by 4096×2160 pixels, and the quantization bits of the image signal output by the pixels need to be 16 bits.

The 6G multiplexer FPGA 20 multiplexes samples read at once into a group of even-numbered samples and a group of odd-numbered samples, and outputs serial digital data on 2 ch at 5.94 Gbps. At this time, the 6G multiplexer FPGA 20 alternately rearranges the B signal and the R signal pixel by pixel. Similarly, the 6G multiplexer FPGA 20 alternately rearranges the Gb signal and the Gr signal pixel by pixel. When the 2-ch data stream is input to an 8B/10B encoder 21, the 8B/10B encoder 21 subjects active regions on the B/R ch and G ch of HD-SDI and auxiliary data including SAV, EAV, LN, and CRCC to 8B/10B encoding. The 8B/10B encoder 21 thereafter outputs serial digital data converted by the 8B/10B encoding.

The 6G multiplexer FPGA 20 thus folds the video signal read in units of eight pixels as shown in FIG. 5 so as to match the readout clock and signal wiring to a 60 P signal. The 6G multiplexer FPGA 20 then outputs the video signal in units of four pixels at a 148.5-MHz clock rate.

Four pixels output by the 6G multiplexer FPGA 20 are each considered as follows.

For example, "B1, R1, 32, R2, B3, and R3" are considered to correspond to the C ch of HD.

"Gb1, Gr1, Gb2, Gr2, Gb3, and Gr3" are considered to correspond to the Y ch of HD.

When the video signal is multiplexed in this order, and then subjected to 8B/10B conversion, each ch can be transmitted as light or an electric signal at 5.94 Gbps. When the data structure of the output video signal is made to conform to the Y/C ch of HD, the format is easily understood by engineers accustomed to HD signal processing. In addition, a recognition error in data conversion can be prevented.

A transmission rate at each frame rate is calculated here.

[Calculation of Transmission Rate at 24 P-30 P]

$$4400 \text{ pixels} \times 2250 \text{ lines} \times 30 \text{ P} \times 16 \text{ bits} \times 10/8 = 5.94 \text{ Gbps} \quad (1)$$

$$5280 \text{ pixels} \times 2250 \text{ lines} \times 25 \text{ P} \times 16 \text{ bits} \times 10/8 = 5.94 \text{ Gbps} \quad (2)$$

$$5500 \text{ pixels} \times 2250 \text{ lines} \times 24 \text{ P} \times 16 \text{ bits} \times 10/8 = 5.94 \text{ Gbps} \quad (3)$$

Figure 6A:
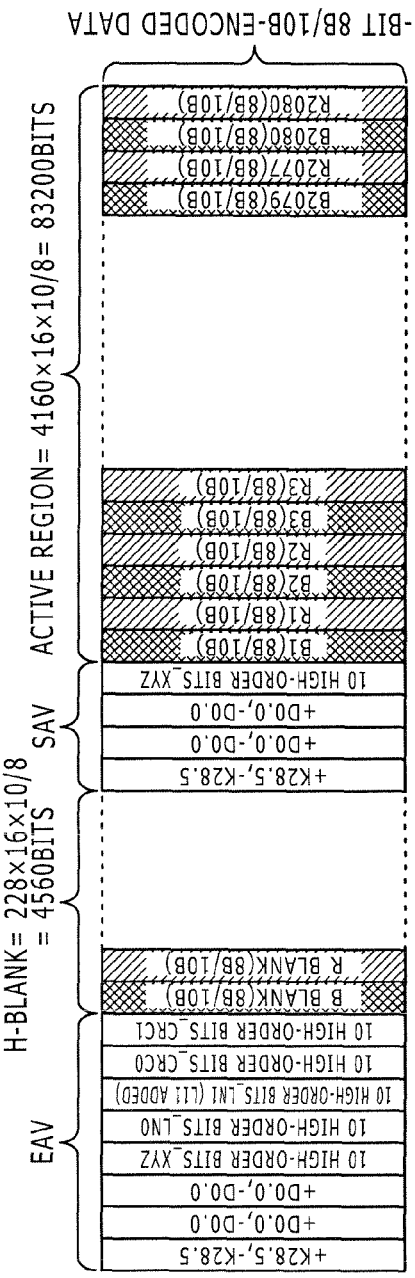
FIGS. 6A and 6B are diagrams of assistance in explaining an example of data structure when a video signal is transmitted at 5.94 Gbps according to the first embodiment of the present invention.
Figure 6B:
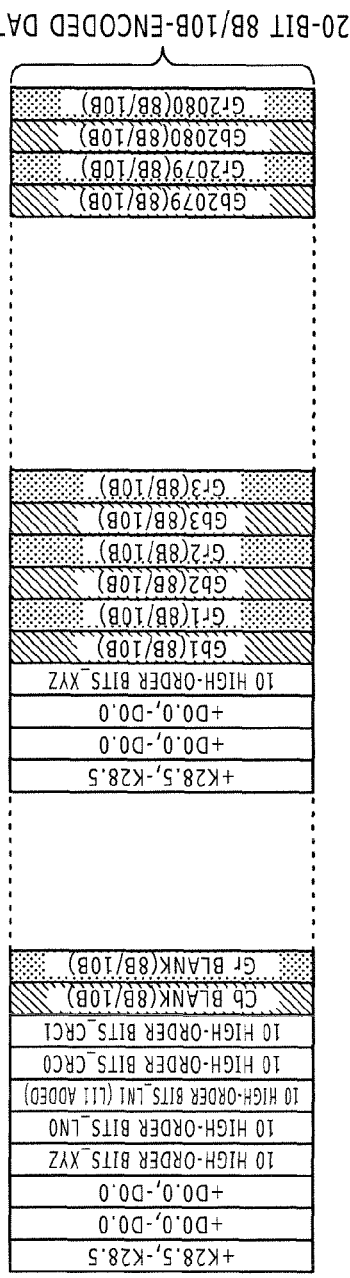

Incidentally, data structures as shown next in FIGS. 6A and 6B are formed after TRS (Timing Reference Signal) signals are multiplexed as with the SAV/EAV of HD to identify effective areas including additional effective areas.

FIGS. 6A and 6B show an example of data structure when a video signal is transmitted at 5.94 Gbps.

The data structure of 6-Gbps Link A corresponding to the C ch of HD-SDI and the data structure of 6-Gbps Link B corresponding to the Y ch of HD-SDI at a frame rate of 30 P will be shown in the following.

FIG. 6A shows an example of a data structure of the link A at 5.94 Gbps.

FIG. 6B shows an example of a data structure of the link B at 5.94 Gbps.

In the data structures of the links A and B, the signal multiplexing part 17 inserts +k28.5, −k28.5, D0.0, D0.0, D0.0, and D0.0 before 8B/10B conversion and inserts XYZ into 10 high-order bits in a region (16 bits) into which to insert the SAV of HD-SDI. XYZ is used as start code of SAV, and is defined in Table 6 of SMPTE 274M-2008 and FIG. 2 and Annex E of SMPTE 292-2008.

In addition, in the data structures of the links A and B, the signal multiplexing part 17 inserts +k28.5, −k28.5, D0.0, D0.0, D0.0, and D0.0 in a region (16 bits) into which to insert the EAV of HD-SDI. The signal multiplexing part 17 also inserts XYZ into 10 high-order bits, LN0 into 10 high-order bits, LN1 (provision for 2250 lines is made possible by adding L11) into 10 high-order bits, CRC0 into 10 high-order bits, and CRC1 into 10 high-order bits in the region into which to insert the EAV.

In this case, attention needs to be given to the following points.

(1) Because all data is subjected to 8B/10B conversion, it suffices to provide two bytes of K28.5 to detect a byte boundary.
(2) Because only 8B/10B conversion is performed, unused bits may be set as reserve (=0).
(3) LN11 is added to LN defined in SMPTE 292 to define 2250 lines.

Incidentally, while XYZ is defined in HD-SDI (SMPTE 274), 0/1 definition of FVH-bits is made with an effective area of a 4 k signal of the Bayer structure as a reference. For example, V=0 in a range of 2204 effective lines, and V=1 in a V-blank area on the outside of the range.

An amount of data in the H-blank of the 6G_link A/B excluding SAV/EAV is calculated here.

$$30 \text{ P}:(240-12(SAV/EAV)) \times 16 \times 10/8 = 4560 \text{ bits} \quad (1)$$

$$25 \text{ P}:(1120-12(SAV/EAV)) \times 16 \times 10/8 = 21260 \text{ bits} \quad (2)$$

$$24 \text{ P}:(1340-12(SAV/EAV)) \times 16 \times 10/8 = 26560 \text{ bits} \quad (3)$$

The broadcasting camera 1 according to the first embodiment described above can transmit a 4 k×2 k/23.98 P-30 P/16-bit video signal read from an image pickup element of the double density Bayer structure on 2 ch at 5.94 Gbps using 8B/10B code. The 6G multiplexer FPGA 20 receives a pulse for identifying SAV/EAV as shown in FIG. 5 in timing of the SAV/EAV defined by the data structure shown in FIGS. 6A and 6B. The 6G multiplexer FPGA 20 can therefore identify the start timing of the SAV/EAV using XYZ multiplexed in the SAV and EAV. Thus, prohibited code for identifying the SAV/EAV as defined in HD do not need to be provided for video data. 000h-003h and 3FCh-3FFh at the time of 10 bits and 000h-00Fh and FF0h-FFFh at the time of 12 bits are used for TRS and ANC headers, and are thus prohibited from being used for video data. These regions are referred to as prohibited code.

In addition, data from all "0s" to all "1s" can be used as a 16-bit video signal, which is very useful when the number of quantization bits is large as 16 in video representation.

When an ANC/audio signal needs to be multiplexed, it suffices to multiplex the data in 10 high-order bits of 16 bits in compliance with SMPTE 291 or SMPTE 299 as an ANC/audio standard for HD-SDI. At this time, when ANC/audio data is included in an image signal, the signal multiplexing part 17 multiplexes the ANC/audio data in a horizontal auxiliary data space of HD-SDI.

<Second Embodiment: Transmitting Double Density Bayer 4 k/47.95 P-60 P/16-Bit Signal at 5.94 Gbps on 4 Ch Using 8B/10B Code<

An example of operation of a broadcasting camera 1 according to a second embodiment of the present invention will next be described with reference to FIG. 7 and FIGS. 8A and 8B.

Description in the following will be made of a system of transmitting a double density Bayer 4 k/47.95 P-60 P/16-bit signal at 5.94 Gbps on 4 ch using 8B/10B code.

Figure 7:
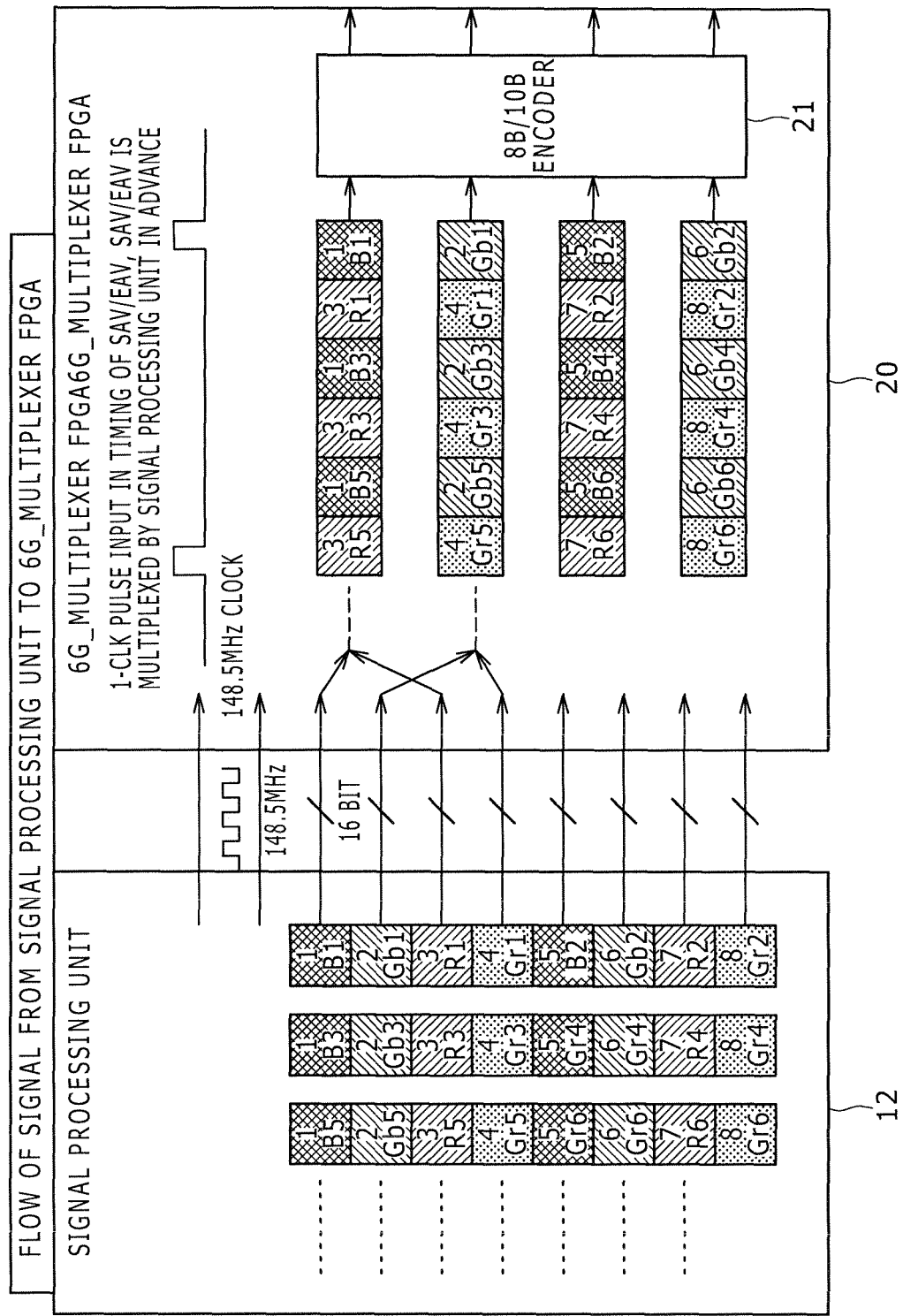
FIG. 7 is a diagram of assistance in explaining an example of processing of a signal supplied from a signal processing unit according to a second embodiment of the present invention to a 6G multiplexer FPGA capable of processing a 6G signal.

FIG. 7 shows an example of signal multiplexing in a 6G multiplexer FPGA 20 for applying predetermined processing to a 6G signal received from a signal processing unit 12 and then outputting the resulting signal.

The signal processing unit 12 outputs an image signal in order of a B signal, a Gb signal, an R signal, and a Gr signal.

The 6G multiplexer FPGA 20 included in the broadcasting camera 1 rearranges the image signal received from the signal processing unit 12 at each 148.5-MHz clock. A timing pulse is input to the 6G multiplexer FPGA 20 at each clock in timing of SAV/EAV.

The 6G multiplexer FPGA 20 performs the following processing when the frame rate of the image signal input from an image sensor 11 is 47.95 P, 48 P, 50 P, 59.94 P, and 60 P. In this case, the image sensor 11 needs to be formed by 4096×2160 pixels, and the quantization bits of the image signal output by the pixels need to be 16 bits.

The 6G multiplexer FPGA 20 multiplexes each set of half of image signals read at once into a group of even-numbered image signals and a group of odd-numbered image signals, and outputs serial digital data on 4 ch at 5.94 Gbps. At this time, the 6G multiplexer FPGA 20 alternately rearranges the B signal and the R signal pixel by pixel, and performs 8B/10B encoding. Similarly, the 6G multiplexer FPGA 20 alternately rearranges the Gb signal and the Gr signal pixel by pixel. When a 2-ch data stream is input to an 8B/10B encoder 21, the 8B/10B encoder 21 outputs serial digital data converted by 8B/10B-encoding active regions on a B/R ch and a G ch of a data structure corresponding to HD-SDI.

The 6G multiplexer FPGA 20 thus folds the video signal read in units of eight pixels as shown in FIG. 5 so as to match the readout clock and signal wiring to a 60 P signal. The 6G multiplexer FPGA 20 then outputs the video signal in units of four pixels at a 148.5-MHz clock rate.

A 4 k signal of the double density Bayer structure shown in FIG. 1 is read out from a lower left in units of eight pixels at a 148.5-MHz clock rate, for example.

Four pixels output by the 6G multiplexer FPGA 20 are each considered as follows.

(1) "B1, R1, B3, R3, B5, and R5" are considered to correspond to the C ch of HD.

(2) "Gb1, Gr1, Gb3, Gr3, Gb5, and Gr5" are considered to correspond to the Y ch of HD.

(3) "B2, R2, B4, R4, B6, and R6" are considered to correspond to the C ch of HD.

(4) "Gb2, Gr2, Gb4, Gr4, Gb6, and Gr6" are considered to correspond to the Y ch of HD.

When the video signal is multiplexed in this order, and then subjected to 8B/10B conversion, each ch can be transmitted as a light signal or an electric signal at 5.94 Gbps. When the data structure of the video signal is made to conform to the Y/C ch of HD, the format is easily understood by engineers accustomed to HD signal processing, and at the same time, an error can be prevented. In addition, four high-order pixels can be input and output as a signal with the same wiring and the same clock frequency as in FIG. 3. Thus, the clock frequency does not need to be changed at a time of switching between a 30 P signal and a 60 P signal, and hardware (circuit scale) does not need to be increased.

[Calculation of Transmission Rate at 47.95 P-60 P]

$$4400 \text{ pixels} \div 2 \times 2250 \text{ lines} \times 60 \text{ P} \times 16 \text{ bits} \times 10/8 = 5.94 \text{ Gbps} \quad (1)$$

$$5280 \text{ pixels} \div 2 \times 2250 \text{ lines} \times 50 \text{ P} \times 16 \text{ bits} \times 10/8 = 5.94 \text{ Gbps} \quad (2)$$

$$5500 \text{ pixels} \div 2 \times 2250 \text{ lines} \times 48 \text{ P} \times 16 \text{ bits} \times 10/8 = 5.94 \text{ Gbps} \quad (3)$$

Incidentally, the data structures as shown in FIGS. 6A and 6B are formed after TRS (Timing Reference Signal) signals are multiplexed as with the SAV/EAV of HD to identify effective areas including additional effective areas.

In the data structures of links A and B in the present example, +k28.5, −k28.5, D0.0, D0.0, D0.0, and D0.0 before 8B/10B conversion are inserted in SAV (16 bits), and XYZ is inserted into 10 high-order bits in the SAV, in place of SAV/EAV of HD-SDI.

In addition, in the data structures of the links A and B, +k28.5, −k28.5, D0.0, D0.0, D0.0, and D0.0 before 8B/10B conversion are inserted in EAV (16 bits). Further, XYZ is inserted into 10 high-order bits, LN0 is inserted into 10 high-order bits, LN1 (provision for 2250 lines is made possible by adding L11) is inserted into 10 high-order bits, CRC0 is inserted into 10 high-order bits, and CRC1 is inserted into 10 high-order bits.

In this case, attention needs to be given to the following points.

(1) Because all data is subjected to 8B/10B conversion, it suffices to provide two bytes of K28.5 to detect a byte boundary.

(2) Because only 8B/10B conversion is performed, unused bits may be set as reserve (=0).

(3) LN11 is added to LN defined in SMPTE 292 to define 2250 lines.

While XYZ is defined in HD-SDI (SMPTE 274), 0/1 definition of FVH-bits is made with an effective area of a 4 k signal of the Bayer structure as a reference. For example, V=0 in a range of 2204 effective lines, and V=1 in a V-blank area on the outside of the range.

[Calculation of Amount of Data in H-Blank of 6G_Link A/B/C/D Excluding SAV/EAV]

$$30\ P{:}(240 \div 2 - 12(SAV/EAV)) \times 16 \times 10/8 = 2160\ \text{bits} \tag{1}$$

$$25\ P{:}(1120 \div 2 - 12(SAV/EAV)) \times 16 \times 10/8 = 10960\ \text{bits} \tag{2}$$

$$24\ P{:}(1340 \div 2 - 12(SAV/EAV)) \times 16 \times 10/8 = 13160\ \text{bits} \tag{3}$$

FIGS. 8A and 8B show data structures corresponding to the C ch and Y ch of HD-SDI.

In this case, only odd samples of the data structure of 6-Gbps Link A corresponding to the C ch of HD-SDI and the data structure of 6-Gbps Link B corresponding to the Y ch of HD-SDI are shown. Odd samples in this case refer to odd-numbered samples of B and R and odd-numbered samples of Gb and Gr. Even samples refer to even-numbered samples of B and R and even-numbered samples of Gb and Gr.

The broadcasting camera 1 according to the second embodiment described above can transmit a 4 k×2 k/47.95 P-60 P/16-bit video signal read from an image pickup element of the double density Bayer structure on 4 ch at 5.94 Gbps using 8B/10B code. The 6G multiplexer FPGA 20 receives a pulse for identifying SAV/EAV as shown in FIG. 7 in timing of the SAV/EAV defined by the data structure shown in FIGS. 8A and 8B. The 6G multiplexer FPGA 20 can therefore identify the start timing of the SAV/EAV using XYZ shown in FIGS. 8A and 8B. Thus, prohibited code for identifying the SAV/EAV as defined in HD do not need to be provided for video data.

In addition, data from all "0s" to all "1s" of 16 bits can be used. This is very useful when the number of quantization bits is large as 16 in video representation.

When an ANC/audio signal needs to be multiplexed, the data is multiplexed in 10 high-order bits of 16 bits in compliance with SMPTE 291 or SMPTE 299 as an ANC/audio standard for HD-SDI.

<Third Embodiment: Transmitting Double Density Bayer 4 k/23.98 P-30 P/16-Bit Signal at 10.692 Gbps on 1 Ch Using 8B/10B Code and Scramble>

An example of operation of a broadcasting camera 1 according to a third embodiment of the present invention will next be described with reference to FIG. 9 and FIG. 10.

Description in the following will be made of a system of transmitting a double density Bayer 4 k/23.98 P-30 P/16-bit signal at 10.692 Gbps on 1 ch using 8B/10B code and a scramble.

Figure 9:
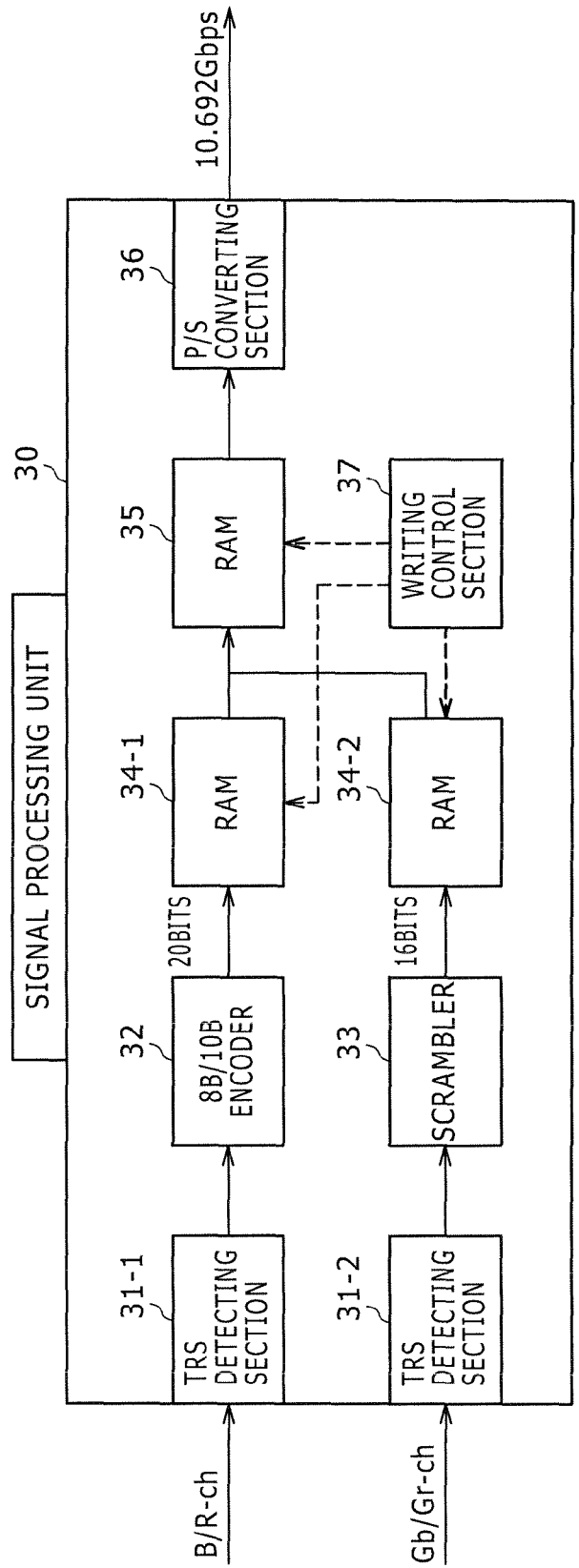
FIG. 9 is a block diagram showing an example of internal configuration of a signal processing unit according to a third embodiment of the present invention.

FIG. 9 shows an example of internal configuration of a signal processing unit 30.

The signal processing unit 30 receives a 4 k signal or a signal obtained by multiplexing the 4 k signal on 2 ch at 5.94 Gbps from the signal processing unit 12 shown in FIG. 3. The signal processing unit 30 includes a TRS detecting section 31-1 for detecting a multiplexed TRS from a signal made to have a data structure corresponding to HD-SDI on a B/R ch which signal is input from the signal multiplexing part 17. The signal processing unit 30 also includes a TRS detecting section 31-2 for detecting a multiplexed TRS from a signal made to have a data structure corresponding to HD-SDI on a Gb/Gr ch which signal is input from the signal multiplexing part 17.

The signal processing unit 30 also includes an 8B/10B encoder 32 for 8B/10B-encoding an active region from the signal from which the TRS is detected by the TRS detecting section 31-1 and which signal is made to have the data structure corresponding to HD-SDI on the B/R ch. The signal processing unit 30 also includes a RAM 34-1 for storing the 8B/10B-encoded data.

The signal processing unit 30 also includes a scrambler 33 for applying a frame synchronous type scramble to an active region from the signal from which the TRS is detected by the TRS detecting section 31-2 and which signal is made to have the data structure corresponding to HD-SDI on the G ch. The signal processing unit 30 also includes a RAM 34-2 for storing the scrambled data.

The signal processing unit 30 also includes a RAM 35 for storing data read from the RAMs 34-1 and 34-2 in a predetermined data structure. The writing and reading of data to and from the RAMs 34-1, 34-2, and 35 are performed under control of a writing control section 37. The signal processing unit 30 also includes a parallel-to-serial converting section 36 for converting data read from the RAM 35 from parallel data to serial data. The parallel-to-serial converting section 36 converts parallel digital data input in parallel from the 8B/10B encoder 32 and the scrambler 33 into serial digital data, and outputs the serial digital data as a 10.692-Gbps transmission stream.

Description will next be made of an example of operation of the signal processing unit 30.

The signal processing unit 30 performs the following processing when the frame rate of an image signal input from an image sensor 11 is 23.98 P, 24 P, 25 P, 29.97 P, or 30 P. In this case, the image sensor 11 needs to be formed by 4096×2160 pixels, and the quantization bits of the image signal output by the pixels need to be 16 bits.

When the TRS detecting section 31-1 receives a 4 k signal of the double density Bayer structure shown in FIG. 15B or a signal obtained by multiplexing the 4 k signal on 2 ch at 5.94 Gbps from a 6G multiplexer FPGA 20, the TRS detecting section 31-1 detects SAV and EAV from a TRS signal. The 8B/10B encoder 32 performs 8B/10B conversion from a start of the SAV on a B/R ch. At this time, the 8B/10B encoder 32 converts the video signal of each pixel into a data length of 20 bits, and stores the video signal in the RAM 34-1.

Meanwhile, when the TRS detecting section 31-2 receives a video signal on a Cb/Cr ch, the scrambler 33 applies a frame synchronous type scramble to the video signal. The frame synchronous type scramble is a process of scrambling the video signal with an initial value of a scrambler set at a predetermined value such as all "0s" or the like for a period of one frame or a period of one line from an active video period next to SAV, for example. The scrambler 33 scrambles the video signal of each pixel into a data length of 16 bits, and stores the video signal in the RAM 34-2.

The frame synchronous type scramble in this case is a process of setting an initial value of a register of a generator polynomial of a pseudorandom pattern to a predetermined value such as all "0s" or the like in certain timing of a start of a frame or a line, for example, and adding the value to input data by modulo N operation. In the signal receiving device for receiving the video signal, the register of the same generator polynomial is set at the same value as in the signal transmitting device. Then, when the modulo N operation is performed on input data in the same timing as in the signal transmitting device, the original data can be reproduced.

Next, as in HD-SDI, the writing control section 37 multiplexes the image signals in order of the B/R ch, the Gb/Gr ch, the B/R ch, the Gb/Gr ch, the B/R ch, the Gb/Gr ch, . . . , and stores the image signals in the RAM 35. The parallel-to-serial converting section 36 thereafter outputs serial digital data on 1 ch which data has the data structure shown in FIG. 10 at 10.692 Gbps.

Figure 10:
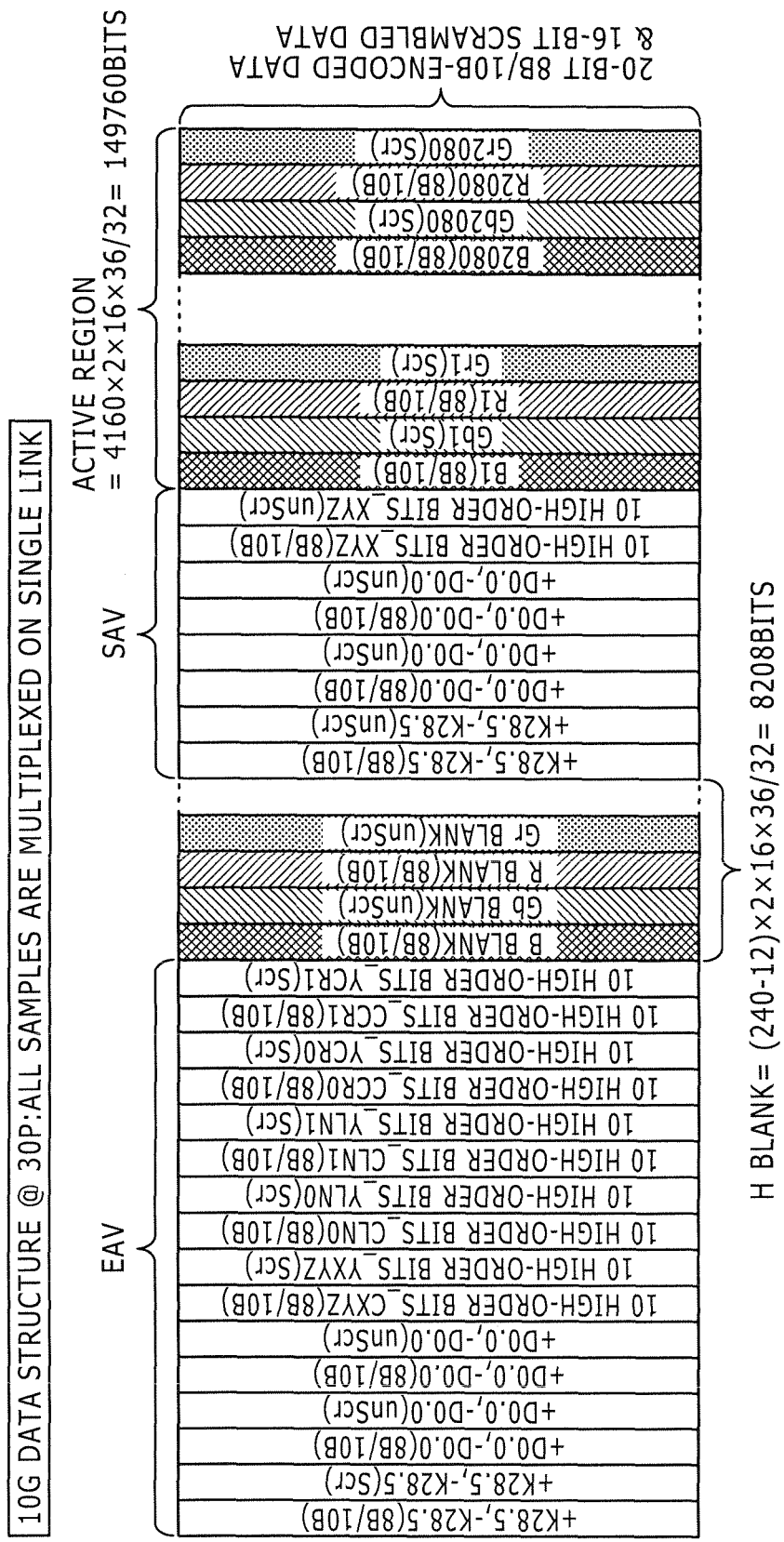
FIG. 10 is a diagram of assistance in explaining an example of data structure when a video signal is transmitted at 10.692 Gbps according to the third embodiment of the present invention.

FIG. 10 shows a data structure when all samples are multiplexed on a single link.

In this case, an example of a 10.692-Gbps data structure obtained by multiplexing all samples on a single link at a frame rate of 30 P is shown.

B/R ch:4400 pixels×2250 lines×30 P×16 bits×10/ 8=5.94 Gbps     (1)

Gb/Gr ch:4400 pixels×2250 lines×30 P×16 bits=4.752 Gbps     (2)

5.94 Gbps+4.752 Gbps=10.692 Gbps     (3)

Similar calculation can be performed also in the cases of 24 P and 25 P.

[Calculation of Amount of Data in H-Blank Excluding SAV/EAV]

Amounts of data in an H-blank will next be calculated.

30 P:(240−12(SAV/EAV))×2×16×36/32=8208 bits     (1)

25 P:(1120−12(SAV/EAV))×2×16×36/32=39888 bits     (2)

24 P:(1340−12(SAV/EAV))×2×16×36/32=47808 bits     (3)

When an ANC/audio signal needs to be multiplexed, the data is multiplexed in 10 high-order bits of 16 bits in compliance with SMPTE 291 or SMPTE 299 as an ANC/audio standard for HD-SDI. In this case, audio data is multiplexed on the B/R ch, and audio control packets are multiplexed on the Gb/Gr ch. When the audio data of 48-kHz audio is 16-ch audio data, 31 samples×4=124 samples are obtained. In this case, when the frame rate is 30 P, 4400−4160=240 samples are obtained. There are 12 samples in total for all of SAV/EAV/LN/CRCC. Thus, a remaining region is 240−12=228 samples. An amount of data of 124 samples necessary for the 16-ch audio data can therefore be stored in the region of 228 samples. That is, it can be said that the audio data of HD-SDI can be multiplexed in the region of 228 samples.

In the case of 30 P, however, there is a smallest amount of data in an H-blank, and it is therefore most difficult to secure a space for multiplexing ANC/audio data. In the case of 30 P, a result 48 kHz÷30 frames÷2250 lines=0.7111 sample lines is obtained. This result indicates that 0.7111 samples can be multiplexed in one line. When it is considered that there are 0.7111 . . . audio samples (capturing of audio) per period of one line, 1/0.7111 is obtained as the number of lines per sample. This means that there are roughly two audio samples in three lines. It is thus shown that ANC/audio data can be multiplexed without any problem.

The signal processing unit 30 according to the third embodiment described above can transmit a 4 k×2 k/23.98 P-30 P/16-bit video signal read from an image pickup element of the double density Bayer structure on 1 ch at 10.692 Gbps using 8B/10B code and a scrambler. In this case, the TRS detecting sections 31-1 and 31-2 can identify SAV/EAV in timing of the SAV/EAV defined by the data structure shown in FIG. 10, and identify the start timing of the SAV/EAV.

In addition, data from all "0s" to all "1s" can be used as a 16-bit video signal, which is very useful when the number of quantization bits is large as 16 in video representation.

When an ANC/audio signal needs to be multiplexed, it suffices to multiplex the data in 10 high-order bits of 16 bits in compliance with SMPTE 291 or SMPTE 299 as an ANC/audio standard for HD-SDI.

<Fourth Embodiment: Transmitting Double Density Bayer 4 k/47.95 P-60 P/16-Bit Signal at 10.692 Gbps on 2 Ch Using 8B/10B Code and Scramble>

An example of operation of a broadcasting camera 1 according to a fourth embodiment of the present invention will next be described with reference to FIG. 11 and FIG. 12.

Description in the following will be made of a system of transmitting a double density Bayer 4 k/47.95 P-60 P/16-bit signal at 10.692 Gbps on 2 ch using 8B/10B code and a scramble.

Figure 11:
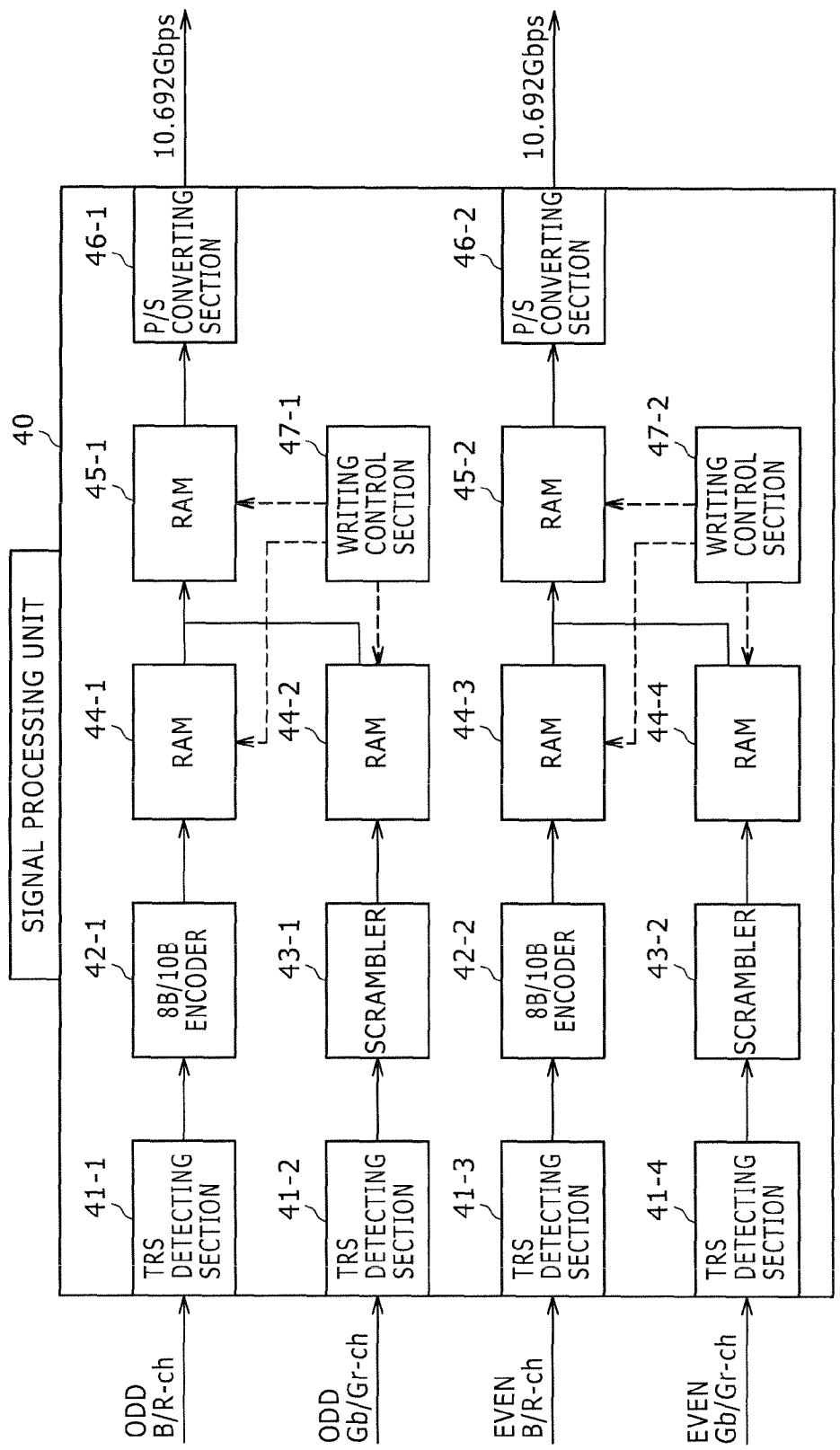
FIG. 11 is a block diagram showing an example of internal configuration of a signal processing unit according to a fourth embodiment of the present invention.

FIG. 11 shows an example of internal configuration of a signal processing unit 40.

The signal processing unit 40 performs the following processing when the frame rate of an image signal input from an image sensor 11 is 47.95 P, 48 P, 50 P, 59.94 P, and 60 P. In this case, the image sensor 11 needs to be formed by 4096×2160 pixels, and the quantization bits of the image signal output by the pixels need to be 16 bits.

The signal processing unit 40 includes a TRS detecting section 41-1 for detecting a multiplexed TRS from an HD-SDI signal on a B/R ch of pixels of odd samples input from the signal multiplexing part 17. The signal processing unit 40 also includes a TRS detecting section 41-2 for detecting a multiplexed TRS from an HD-SDI signal on a Gb/Gr ch of odd samples input from the signal multiplexing part 17. The signal processing unit 40 also includes a TRS detecting section 41-3 for detecting a multiplexed TRS from an HD-SDI signal on a B/R ch of pixels of even samples input from the signal multiplexing part 17. The signal processing unit 40 also includes a TRS detecting section 41-4 for detecting a multiplexed TRS from an HD-SDI signal on a Gb/Gr ch of even samples input from the signal multiplexing part 17.

The signal processing unit 40 also includes an 8B/10B encoder 42-1 for 8B/10B-encoding an active region of the HD-SDI signal on the B/R ch from which signal the TRS is detected by the TRS detecting section 41-1. The signal processing unit 40 also includes an 8B/10B encoder 42-2 for 8B/10B-encoding an active region of the HD-SDI signal on the B/R ch from which signal the TRS is detected by the TRS detecting section 41-3. The signal processing unit 40 also includes RAMs 44-1 and 44-3 for storing data 8B/10B-encoded by the 8B/10B encoders 42-1 and 42-2.

The signal processing unit 40 also includes a scrambler 43-1 for applying a frame synchronous type scramble to an active region of the HD-SDI signal on the Gb/Gr ch from which signal the TRS is detected by the TRS detecting section 41-2. The signal processing unit 40 also includes a scrambler 43-2 for applying a frame synchronous type scramble to an active region of the HD-SDI signal on the Gb/Gr ch from which signal the TRS is detected by the TRS detecting section 41-4. The signal processing unit 40 also includes RAMs 44-2 and 44-4 for storing data scrambled by the scramblers 43-1 and 43-2.

The signal processing unit 40 also includes a RAM 45-1 for storing data read from the RAMs 44-1 and 44-2 in a predetermined data structure. The writing and reading of data to and from the RAMs 44-1, 44-2, and 45-1 are performed under control of a writing control section 47-1. The signal processing unit 40 also includes a RAM 45-2 for storing data read from the RAMs 44-3 and 44-4 in a predetermined data structure. The writing and reading of data to and from the RAMs 44-3, 44-4, and 45-2 are performed under control of a writing control section 47-2.

Parallel digital data input in parallel from the 8B/10B encoder 42-1 and the scrambler 43-1 is stored in the RAM 45-1. The signal processing unit 40 also includes a parallel-to-serial converting section 46-1 for converting the parallel digital data read from the RAM 45-1 into serial digital data, and outputting the serial digital data in a 10.692 Gbps transmission format.

Parallel digital data input in parallel from the 8B/10B encoder 42-2 and the scrambler 43-2 is stored in the RAM 45-2. The signal processing unit 40 also includes a parallelto-serial converting section 46-2 for converting the parallel digital data read from the RAM 45-2 into serial digital data, and outputting the serial digital data in a 10.692 Gbps transmission format.

Description will next be made of an example of operation of the signal processing unit 40.

Odd samples on the B/R ch and the Gb/Gr ch and even samples on the B/R ch and the Gb/Gr ch are input to the signal processing unit 40 separately from each other.

The TRS detecting sections 41-1 and 41-3 receive a 4 k signal of the double density Bayer structure shown in FIG. 15B or a signal obtained by multiplexing the 4 k signal on 4 ch at 5.94 Gbps. At this time, the 8B/10B encoders 42-1 and 42-2 perform 8B/10B conversion from a start of SAV on the B/R ch, as shown in FIG. 10. At this time, the 8B/10B encoders 42-1 and 42-2 convert the video signal of each pixel into a data length of 20 bits, and store the video signal in the RAMs 44-1 and 44-3.

Meanwhile, when the TRS detecting sections 41-2 and 41-4 receive a video signal on a Cb/Cr ch, the scramblers 43-1 and 43-2 apply a frame synchronous type scramble to the video signal. At this time, the scramblers 43-1 and 43-2 apply the frame synchronous type scramble with an initial value of the scramblers set at a predetermined value such as all "0s" or the like for a period of one frame or a period of one line, for example, from a start of SAV. The scramblers 43-1 and 43-2 scramble the video signal of each pixel into a data length of 16 bits, and store the video signal in the RAMs 44-2 and 44-4.

Next, as in HD-SDI, the writing control section 47-1 multiplexes the image signals in order of the B/R ch, the Gb/Gr ch, the B/R ch, the Gb/Gr ch, the B/R ch, the Gb/Gr ch, ..., and stores the image signals in the RAM 45-1. The parallel-to-serial converting section 46-1 thereafter outputs serial digital data as a 10.692-Gbps signal of the data structure shown in FIG. 10.

Meanwhile, as in HD-SDI, the writing control section 47-2 multiplexes the image signals in order of the B/R ch, the Gb/Gr ch, the B/R ch, the Gb/Gr ch, the B/R ch, the Gb/Gr ch, ..., and stores the image signals in the RAM 45-2. The parallel-to-serial converting section 46-2 thereafter outputs serial digital data as a 10.692-Gbps signal of the data structure shown in FIG. 10. The parallel-to-serial converting sections 46-1 and 46-2 thus output the serial digital data on 2 ch at 10.692 Gbps.

Odd/even-sample $B/R$ ch:4400 pixels÷2×2250 lines× 60 P×16 bits×10/8=5.94 Gbps (1)

Odd/even-sample $Gb/Gr$ ch:4400 pixels÷2×2250 lines×60 P×16 bits=4.752 Gbps (2)

5.94 Gbps+4.752 Gbps=10.692 Gbps (3)

Similar calculation can be performed also in the cases of 24 P and 25 P.

[Calculation of Amount of Data in H-Blank on First Ch and Second Ch at 10.692 Gbps Excluding SAV/EAV]

30 P: (240÷2−12 ($SAV/EAV$))×2×16×36/32=3888 bits (1)

25 P: (1120÷2−12 ($SAV/EAV$))×2×16×36/32=19728 bits (2)

24 P: (1340÷2−12 ($SAV/EAV$))×2×16×36/32=23688 bits (3)

When an ANC/audio signal needs to be multiplexed, the data is multiplexed in 10 high-order bits of 16 bits in compliance with SMPTE 291 or SMPTE 299 as an ANC/audio standard for HD-SDI. When the audio data of 48-kHz audio is 16-ch audio data, 31 bytes×4=124 bytes are obtained. This value is smaller than (240÷2−12)×2=216 samples at 30 P. Thus, the audio data can be multiplexed.

Incidentally, in the case of 60 P, there is a smallest amount of data in an H-blank. It is therefore most difficult to secure a multiplexing space. In the case of 60 P, a result 48 kHz÷60 frames÷2250 lines=0.3555 sample lines is obtained. This result indicates that 0.3555 samples can be multiplexed in one line (for example every third line has an audio sample). It is thus shown that ANC/audio data can be multiplexed without any problem.

Figure 12:
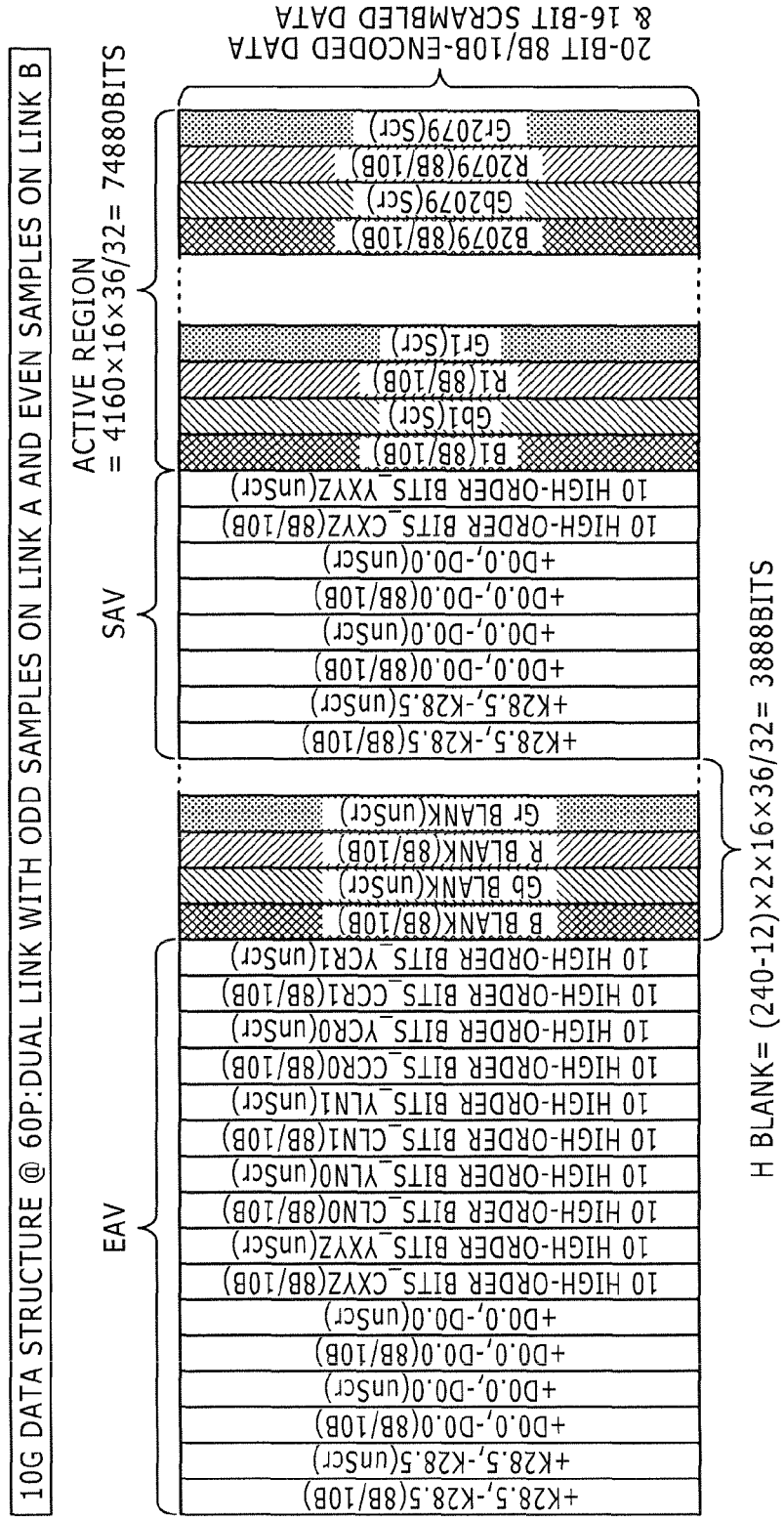
FIG. 12 is a diagram of assistance in explaining an example of data structure when a video signal is transmitted at 10.692 Gbps according to the fourth embodiment of the present invention.

FIG. 12 shows a data structure corresponding to the C ch and Y ch of HD-SDI.

In this case, an example of multiplexing odd samples on the Link A of a dual link and multiplexing even samples on the link B of the dual link at a frame rate of 60 P is shown.

The signal processing unit 40 according to the fourth embodiment described above can transmit a 4 k×2 k/47.95 P-60 P/16-bit video signal read from an image pickup element of the double density Bayer structure on 2 ch at 10.692 Gbps using 8B/10B code and a scrambler. A pulse for identifying SAV/EAV is received as shown in FIG. 11 in timing of the SAV/EAV defined by the data structure shown in FIG. 12. Thus, the 6G multiplexer FPGA 20 can identify the start timing of the SAV/EAV using XYZ multiplexed in the SAV and the EAV.

In addition, data from all "0s" to all "1s" can be used as a 16-bit video signal, which is very useful when the number of quantization bits is large as 16 in video representation.

When an ANC/audio signal needs to be multiplexed, it suffices to multiplex the data in 10 high-order bits of 16 bits in compliance with SMPTE 291 or SMPTE 299 as an ANC/audio standard for HD-SDI.

<Fifth Embodiment: Transmitting Double Density Bayer CinemaScope (Aspect Ratio of 1:2.4) 4 k/36 P/16-Bit Signal at 10.692 Gbps on 1 Ch Using 8B/10B Code and Scramble>

An example of operation of a broadcasting camera 1 according to a fifth embodiment of the present invention will next be described with reference to FIG. 13.

Description in the following will be made of a system of transmitting a double density Bayer CinemaScope 4 k/36 P/16-bit signal at 10.692 Gbps on 1 ch using 8B/10B code and a scramble.

Figure 13:
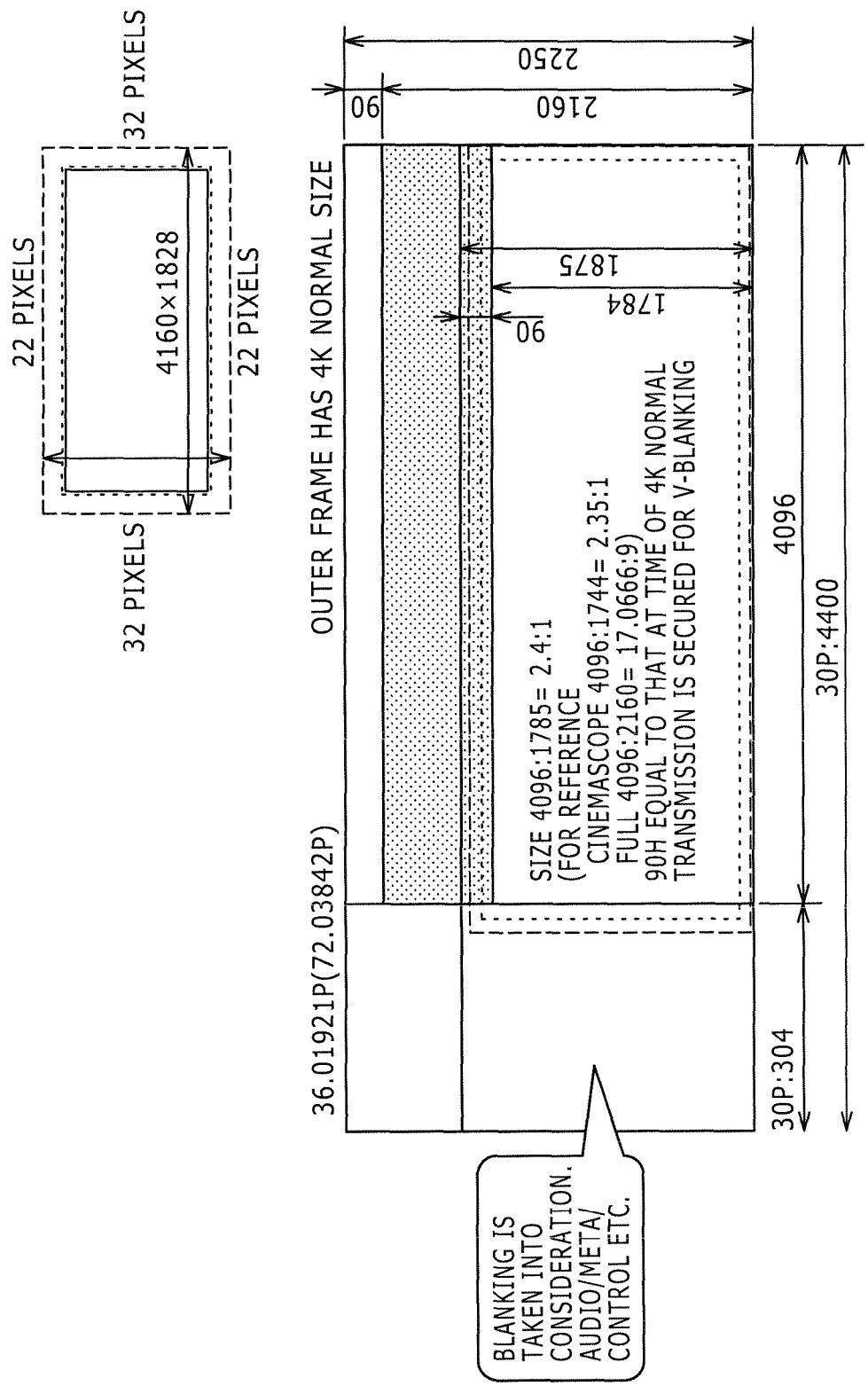
FIG. 13 is a diagram of assistance in explaining an example of double density Bayer CinemaScope according to a fifth embodiment of the present invention.
Figure 14A:
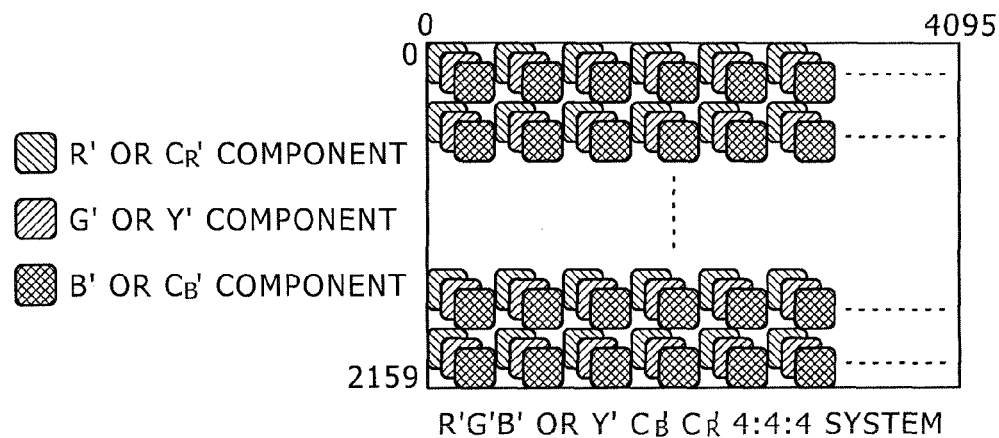
FIGS. 14A and 14B are diagrams of assistance in explaining an example of sample structure of UHDTV standards.
Figure 14B:
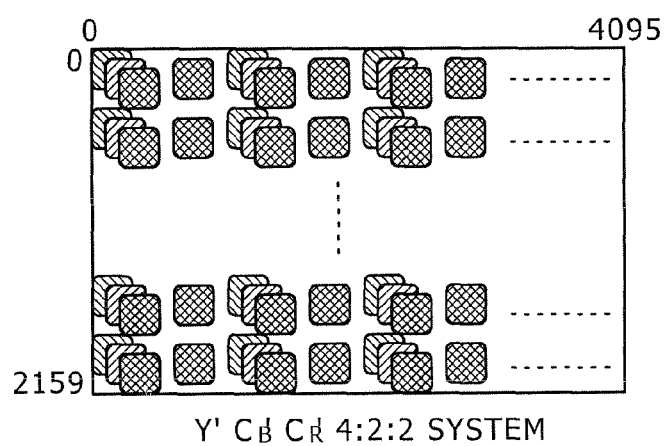

FIG. 13 shows an example of double density Bayer CinemaScope.

When 36 P CinemaScope data having an aspect ratio of 1:2.4=1784:4096 is transmitted, a total number of lines is 1875. In this case, 32 pixels are provided for a margin in a horizontal direction on each of a left side and a right side, and 22 pixels are provided for a margin in a vertical direction on each of a top side and a bottom side. Thus, a total number of pixels is (4096+32×2)×(1784+22×2)=4160×1828.

In this case, the following equation holds.

10.692 Gbps÷36 P÷1875 lines=158400 bit lines

Video data of 16 bits is supplied from a signal processing unit 12 by the same system as in FIG. 5. Because the aspect ratio is increased, the number of lines is reduced to 1875. However, the number of effective samples is the same as that of a 4 k signal at 30 P as shown in the first embodiment even when the number of pixels of an additional effective area and an H-blank is included. Thus, although the 4 k signal at 30 P and double density Bayer CinemaScope have different screen aspect ratios and different frame rates, a CinemaScope 36 P signal can be multiplexed and transmitted on 1 ch at 10.692 Gbps with the same data structure as in the third embodiment.

B/R ch:4400 pixels×1875 lines×36 P×16 bits×10/ 8=5.94 Gbps     (1)

Gb/Gr ch:4400 pixels×1875 lines×36 P×16 bits=4.752 Gbps     (2)

5.94 Gbps+4.752 Gbps=10.692 Gbps     (3)

An ANC/audio signal can be multiplexed in a similar manner to that of the third embodiment, and therefore description thereof will be omitted.

A signal processing unit 30 according to the fifth embodiment thus performs a process of multiplexing an image signal when the frame rate of the image signal input from an image sensor 11 is 36 P. At this time, the image sensor 11 needs to be formed by 4096×1785 pixels with an aspect ratio of 1:2.4, and the quantization bits of the image signal output by the pixels need to be 16 bits. A parallel-to-serial converting section 36 outputs serial digital data on 1 ch at 10.692 Gbps.

The signal processing unit according to the fifth embodiment described above can transmit a 4 k/36 P/16-bit signal read from an image pickup element as a double density Bayer CinemaScope signal (aspect ratio=1:2.4) on 1 ch at 10.692 Gbps using 8B/10B code and a scramble. Thus, TRS detecting sections 31-1 and 31-2 can identify SAV/EAV in timing of the SAV/EAV defined by the data structure shown in FIG. 10, and identify the start timing of the SAV/EAV.

<Sixth Embodiment: Transmitting Double Density Bayer CinemaScope (Aspect Ratio of 1:2.4) 4 k/72 P/16-Bit Signal at 10.692 Gbps on 2 Ch Using 8B/10B Code and Scramble>

An example of operation of a broadcasting camera 1 according to a sixth embodiment of the present invention will next be described.

Description in the following will be made of a system of transmitting serial digital data as a double density Bayer CinemaScope 4 k/72 P/16-bit signal at 10.692 Gbps on 2 ch using 8B/10B code and a scramble.

A signal processing unit 40 performs the following processing when the frame rate of an image signal input from an image sensor 11 is 72 P. In this case, the image sensor 11 needs to be formed by 4096×2160 pixels, and the quantization bits of the image signal output by the pixels need to be 16 bits. When a CinemaScope data 72 P signal having an aspect ratio of 1:2.4=1784:4096 is transmitted, a total number of lines is 1875.

10.692 Gbps÷72 P÷1875 lines=79200 bit lines

Data of 16 bits is supplied from a signal processing unit 12 by the same system as in FIG. 5. Because the aspect ratio is increased, the number of lines is reduced to 1875. However, the number of effective samples is the same as that of a 4 k signal at 60 P as shown in the second embodiment even when the number of pixels of an additional effective area and an H-blank is included. Thus, although the 4 k signal at 60 P and double density Bayer CinemaScope have different aspect ratios and different frame rates, a CinemaScope 72 P signal can be multiplexed and transmitted as serial digital data on 2 ch at 10.692 Gbps with the same data structure as in the fourth embodiment.

Odd/even-sample B/R ch:4400 pixels÷2×1875 lines× 72 P×16 bits×10/8=5.94 Gbps     (1)

Odd/even-sample Gb/Gr ch:4400 pixels÷2×1875 lines×72 P×16 bits=4.752 Gbps     (2)

5.94 Gbps+4.752 Gbps=10.692 Gbps     (3)

ANC/audio multiplexing is also the same as in the fourth embodiment.

The signal processing unit according to the sixth embodiment described above can transmit a 4 k/72 P/16-bit signal read from an image pickup element as a double density Bayer CinemaScope signal (aspect ratio=1:2.4) on 2 ch at 10.692 Gbps using 8B/10B code and a scramble. Thus, TRS detecting sections 31-1 and 31-2 can identify SAV/EAV in timing of the SAV/EAV defined by the data structure shown in FIG. 12, and identify the start timing of the SAV/EAV.

The signal processing units according to the first to sixth embodiments described above produce the following effects.

The same 148.5-MHz clock is used without changing clock frequency by making the signal processing unit 12 and the 6G multiplexer FPGA 20 have the configuration and wiring shown in FIG. 5 and FIG. 7 for double density Bayer 4 k/23.98 P-30 P and 47.95 P-60 P. Thus, switching between 23.98 P-30 P and 47.95 P-60 P can be performed without changing clock connection and settings. Therefore a clock system needs only a minimum hardware (circuit) scale.

In addition, as shown in FIG. 5 and FIG. 7, the signal processing unit 12 multiplexes SAV/EAV in front and in the rear of an effective area of data, and enables SAV/EAV identification by using a timing pulse adjusted to the SAV/EAV and XYZ multiplexed in the SAV/EAV. Thus, it is not necessary to provide prohibited code for video data. This provides effects of being able to use data from all "0s" to all "1s" as a 16-bit video signal and being able to make the most of the 16-bit video signal.

In addition, a 4 k signal and a CinemaScope signal of the double density Bayer structure can be multiplexed and transmitted at 5.94 Gbps on 2 ch or 4 ch or at 10.692 Gbps on 1 ch, which is the same as the transmission rate of current SMPTE 435, or at 10.692 Gbps 2 ch. In addition, by using 8B/10B code, it is possible to avoid generation of a pathological signal as in HD-SDI, and utilize commercially available devices for 10 GE.

In addition, by designing the interface data structure of double density Bayer 4 k/16-bit signals to be a data structure similar to the Y ch and C ch of HD-SDI, the format is easily understood by engineers accustomed to HD signals, and errors can be prevented. In addition, by using XYZ of HD-SDI, breaks of effective frames, effective lines and the like can be defined.

The present invention is not limited to the foregoing embodiments, and various other examples of application and modification can be adopted without departing from the spirit of the present invention described in claims.

The present application contains subject matter related to that disclosed in Japanese Priority Patent Application JP 2010-042001 filed in the Japan Patent Office on Feb. 26, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A signal transmitting device comprising:
   a multiplexing section configured to, in a case of an image pickup element of a double density Bayer structure as a pixel arrangement in which pixel density of a Bayer structure is doubled and pixels are arranged obliquely at 45° with respect to said Bayer structure, said double density Bayer structure being a structure such that a first line read in order of a B pixel, a G pixel, an R pixel, and a G pixel and a second line read in order of an R pixel, a G pixel, a B pixel, and a G pixel are arranged alternately in a horizontal direction, generate a B/R ch by alternately multiplexing image signals read from B pixels and R pixels among image signals read and input in units of a predetermined number of samples in each of the first line and the second line from said image pickup element in an active region corresponding to a C ch in High Definition Serial Digital Interface (HD-SDI) together with start code of one of Start Active Video (SAV) and End Active Video (EAV), and generate a G ch by multiplexing, in order, image signals read from G pixels in an active region corresponding to a Y ch in HD-SDI together with said start code; and
an 8B/10B encoder configured to output serial digital data converted by 8B/10B-encoding the active regions on the B/R ch and the G ch having data structures corresponding to said HD-SDI and an auxiliary data region including SAV, EAV, Line Number (LN), and error detection code (CRCC).

2. The signal transmitting device according to claim 1, wherein when ANC/audio data is included in said image signals, said multiplexing section multiplexes said ANC/audio data in a horizontal auxiliary data space of said HD-SDI.

3. The signal transmitting device according to claim 1, wherein said multiplexing section includes a timing pulse generating block configured to receive a readout clock for controlling timing of reading said image signals from said image pickup element and effective video period timing information as information on an effective video period during which video data is superimposed on said image signals, and generate a timing pulse for multiplexing image signals in the active region on one of the B/R ch and the G ch of said HD-SDI, and
a switching control block configured to switch timing of reading image signals from said image pickup element on a basis of said timing pulse received from said timing pulse generating block, and multiplex the image signals in the active region on one of the B/R ch and the G ch of said HD-SDI.

4. The signal transmitting device according to claim 1, wherein said multiplexing section inserts +k28.5, −k28.5, D0.0, D0.0, D0.0, and D0.0 before 8B/10B conversion and inserts said start code into 10 high-order bits in a region into which to insert the SAV of said HD-SDI, and inserts +k28.5, −k28.5, D0.0, D0.0, D0.0, and D0.0 before 8B/10B conversion, said start code into 10 high-order bits, LN0 into 10 high-order bits, LN1 into 10 high-order bits, CRC0 into 10high-order bits, and CRC1 into 10 high-order bits in a region into which to insert the EAV of said HD-SDI.

5. The signal transmitting device according to claim 1, wherein when a frame rate of said image signals input from said image pickup element is one of 23.98P, 24P, 25P, 29.97P, and 30P, said image pickup element is formed by 4096×2160 pixels, and quantization bits of image signals output by said pixels are 16 bits, said multiplexing section multiplexes samples read at once into a group of even-numbered samples and a group of odd-numbered samples, and outputs said serial digital data on 2 ch at 5.94 Gbps.

6. The signal transmitting device according to claim 1, wherein when a frame rate of said image signals input from said image pickup element is one of 47.95P, 48P, 50P, 59.94P, and 60P, said image pickup element is formed by 4096×2160 pixels, and quantization bits of image signals output by said pixels are 16 bits, said multiplexing section multiplexes each set of half of image signals read at once into a group of even-numbered image signals and a group of odd-numbered image signals, and outputs said serial digital data on 4 ch at 5.94 Gbps.

7. The signal transmitting device according to claim 1, further comprising:
a first Time Reference Signal (TRS) detecting section configured to detect a TRS from a signal of a data structure corresponding to HD-SDI on the B/R ch input from said multiplexing section;
an 8B/10B encoder configured to 8B/10B-encode an active region of the signal of the data structure corresponding to HD-SDI on said B/R ch, the TRS from the signal of the data structure corresponding to HD-SDI on said B/R ch being detected by said first TRS detecting section;
a second TRS detecting section configured to detect a TRS from a signal of a data structure corresponding to HD-SDI on the G ch input from said multiplexing section;
a scrambler configured to apply a frame synchronous type scramble to an active region of the signal of the data structure corresponding to HD-SDI on said G ch, the TRS from the signal of the data structure corresponding to HD-SDI on said G ch being detected by said second TRS detecting section; and
a parallel-to-serial converting section configured to convert parallel digital data input in parallel from said 8B/10B encoder and said scrambler into serial digital data, and outputting the serial digital data.

8. The signal transmitting device according to claim 7, wherein when a frame rate of said image signals input from said image pickup element is one of 23.98P, 24P, 25P, 29.97P, and 30P, said image pickup element is formed by 4096×2160 pixels, and quantization bits of image signals output by said pixels are 16 bits, said parallel-to-serial converting section outputs said serial digital data on 1 ch at 10.692 Gbps.

9. The signal transmitting device according to claim 7, wherein when a frame rate of said image signals input from said image pickup element is 36P, said image pickup element is formed by 4096×1785 pixels with an aspect ratio of 1:2.4, and quantization bits of image signals output by said pixels are 16 bits, said parallel-to-serial converting section outputs said serial digital data on 1 ch at 10.692 Gbps.

10. The signal transmitting device according to claim 1, further comprising:
a first Time Reference Signal (TRS) detecting section configured to detect a TRS from an HD-SDI signal on a B/R ch of pixels of odd samples input from said multiplexing section;
a first 8B/10B encoder configured to 8B/10B-encode an active region of the HD-SDI signal on said B/R ch, the TRS from the HD-SDI signal on said B/R ch being detected by said first TRS detecting section;
a second TRS detecting section configured to detect a TRS from an HD-SDI signal on a G ch of pixels of odd samples input from said multiplexing section;
a first scrambler configured to apply a frame synchronous type scramble to an active region of the HD-SDI signal on said G ch, the TRS from the HD-SDI signal on said G ch being detected by said second TRS detecting section;
a first parallel-to-serial converting section configured to convert parallel digital data input in parallel from said first 8B/10B encoder and said first scrambler into serial digital data, and output the serial digital data in a 10.692-Gbps transmission format;

a parallel-to-serial converting section configured to convert parallel digital data into serial digital data, and output the serial digital data;

a third TRS detecting section configured to detect a TRS from an HD-SDI signal on a B/R ch of pixels of even samples input from said multiplexing section;

a second 8B/10B encoder configured to 8B/10B-encode an active region of the HD-SDI signal on said B/R ch, the TRS from the HD-SDI signal on said B/R ch being detected by said third TRS detecting section;

a fourth TRS detecting section configured to detect a TRS from an HD-SDI signal on a G ch of pixels of even samples input from said multiplexing section;

a second scrambler configured to apply a frame synchronous type scramble to an active region of the HD-SDI signal on said G ch, the TRS from the HD-SDI signal on said G ch being detected by said fourth TRS detecting section; and a second parallel-to-serial converting section configured to convert parallel digital data input in parallel from said second 8B/10B encoder and said second scrambler into serial digital data, and output the serial digital data.

11. The signal transmitting device according to claim 10, wherein when a frame rate of said image signals input from said image pickup element is one of 47.95P, 48P, 50P, 59.94P, and 60P, said image pickup element is formed by 4096×2160 pixels, and quantization bits of image signals output by said pixels are 16 bits, said first parallel-to-serial converting section and said second parallel-to-serial converting section output said serial digital data on 2 ch at 10.692 Gbps.

12. The signal transmitting device according to claim 10, wherein when a frame rate of said image signals input from said image pickup element is 72P, said image pickup element is formed by 4096×1785 pixels with an aspect ratio of 1:2.4, and quantization bits of image signals output by said pixels are 16 bits, said first parallel-to-serial converting section and said second parallel-to-serial converting section output said serial digital data on 2 ch at 10.692 Gbps.

13. A signal transmitting method comprising the steps of:

in a case of an image pickup element of a double density Bayer structure as a pixel arrangement in which pixel density of a Bayer structure is doubled and pixels are arranged obliquely at 45° with respect to said Bayer structure, said double density Bayer structure being a structure such that a first line read in order of a B pixel, a G pixel, an R pixel, and a G pixel and a second line read in order of an R pixel, a G pixel, a B pixel, and a G pixel are arranged alternately in a horizontal direction, generating a B/R ch by alternately multiplexing image signals read from B pixels and R pixels among image signals read and input in units of a predetermined number of samples in each of the first line and the second line from said image pickup element in an active region corresponding to a C ch in HD-SDI together with start code of one of Start Active Video (SAV) and End Active Video (EAV), and generating a G ch by multiplexing, in order, image signals read from G pixels in an active region corresponding to a Y ch in HD-SDI together with said start code; and outputting serial digital data converted by 8B/10B-encoding the active regions on the B/R ch and the G ch having data structures corresponding to said HD-SDI and an auxiliary data region including SAV, EAV, line number (LN), and error detection code (CRCC).

* * * * *